United States Patent [19]
Nomura

[11] Patent Number: 5,231,449
[45] Date of Patent: Jul. 27, 1993

[54] ZOOM LENS BARREL AND CAMERA INCORPORATING SUCH BARREL

[75] Inventor: Hiroshi Nomura, Tokyo, Japan

[73] Assignee: Asahi Kogaku Kogyo Kabushiki Kaisha, Tokyo, Japan

[21] Appl. No.: 829,211

[22] Filed: Jan. 31, 1992

Related U.S. Application Data

[62] Division of Ser. No. 361,632, Jun. 2, 1989, Pat. No. 5,144,493.

[30] Foreign Application Priority Data

| Jun. 3, 1988 | [JP] | Japan | 63-137019 |
| Jun. 24, 1988 | [JP] | Japan | 63-83592 |
| Jun. 24, 1988 | [JP] | Japan | 63-83593 |
| Jun. 24, 1988 | [JP] | Japan | 63-83594 |
| Jun. 24, 1988 | [JP] | Japan | 63-83595 |
| Jun. 27, 1988 | [JP] | Japan | 63-84733 |
| Jun. 27, 1988 | [JP] | Japan | 63-84734 |
| Jun. 27, 1988 | [JP] | Japan | 63-84735 |
| Jun. 27, 1988 | [JP] | Japan | 63-84736 |
| Jul. 6, 1988 | [JP] | Japan | 63-89557 |
| Jul. 6, 1988 | [JP] | Japan | 63-89558 |
| Jul. 22, 1988 | [JP] | Japan | 63-97075 |

[51] Int. Cl.⁵ ................................ G03B 7/00
[52] U.S. Cl. ............................. 354/485; 354/286
[58] Field of Search .................... 354/485, 286

[56] References Cited

U.S. PATENT DOCUMENTS

| 3,619,202 | 11/1971 | Bellows . |
| 3,928,859 | 12/1975 | Peterson . |
| 4,043,642 | 8/1977 | Hirose et al. . |
| 4,096,495 | 6/1978 | Nesson et al. . |
| 4,275,952 | 6/1981 | Uesugi . |
| 4,281,907 | 8/1981 | Kamata . |
| 4,324,457 | 4/1982 | Tomori . |
| 4,346,967 | 8/1982 | Komoto et al. . |
| 4,367,934 | 1/1983 | Matsui . |
| 4,445,756 | 5/1984 | Komoto . |
| 4,506,959 | 5/1985 | Hama . |

(List continued on next page.)

FOREIGN PATENT DOCUMENTS

| 58-64172 | 4/1983 | Japan . |
| 59-151467 | 10/1984 | Japan . |
| 62-127513 | 8/1987 | Japan . |
| 63-26832 | 2/1988 | Japan . |
| 63-49740 | 3/1988 | Japan . |
| 63-80534 | 5/1988 | Japan . |
| 63-148213 | 6/1988 | Japan . |
| 63-271306 | 11/1988 | Japan . |
| 8707038 | 11/1987 | PCT Int'l Appl. . |

OTHER PUBLICATIONS

Copy of Minolta Freedom Zoom 90 as advertised in the *Dallas Times Herald* Newspaper on Feb. 13, 1989 (p. 18).

Copy of Brochure for the Minolta Freedom Zoom 90.

*Primary Examiner*—Russell E. Adams
*Attorney, Agent, or Firm*—Sandler Greenblum & Bernstein

[57] ABSTRACT

A zoom lens barrel is disclosed with includes a stationary barrel. A rotatable cam ring is supported by the stationary barrel and is adapted to move along an optical axis direction in association with rotation of the rotatable cam ring. A lens guide ring is adapted to move together with the cam ring along the optical axis direction, and the cam ring is adapted to rotate relative to the lens guide ring, in association with axial movement of the cam ring. Cam grooves are provided for guiding the movement of at least two movable front and rear lens groups, with at least one groove being formed on the cam ring. Lens guide grooves are formed on the lens guide ring and are adapted to correspond to the cam grooves of the cam ring. At least one guide pin is provided which is adapted to extend through an associated cam groove and an associated lens guide groove. The cam grooves and lens guide grooves are shaped such that the movable lens groups can be moved along a predetermined track by the movement which results from axial movement and relative rotation of the cam ring and the lens guide ring.

13 Claims, 18 Drawing Sheets

U.S. PATENT DOCUMENTS

| | | |
|---|---|---|
| 4,508,443 | 8/1985 | Matsuzaki et al. . |
| 4,560,237 | 12/1985 | Ohkura et al. . |
| 4,564,264 | 1/1986 | Komoto . |
| 4,585,313 | 4/1986 | Iwata et al. . |
| 4,596,454 | 6/1986 | Kawai et al. ............... 354/286 |
| 4,621,906 | 11/1986 | Hashimoto et al. . |
| 4,627,691 | 12/1986 | Tomori . |
| 4,639,083 | 1/1987 | Fuziwara et al. . |
| 4,660,954 | 4/1987 | Fujita . |
| 4,671,622 | 6/1987 | Rossman . |
| 4,681,406 | 7/1987 | Naito et al. . |
| 4,748,466 | 5/1988 | Yamada et al. . |
| 4,771,303 | 9/1988 | Matsumoto et al. . |
| 4,804,331 | 2/1989 | Eguchi et al. ............... 439/162 |
| 4,822,153 | 4/1989 | Tomori et al. . |
| 4,833,497 | 5/1989 | Sugawara . |
| 4,848,884 | 7/1989 | Enomoto . |
| 4,864,348 | 9/1989 | Fujiwara et al. . |
| 4,865,433 | 9/1989 | Okajima et al. . |
| 4,911,542 | 3/1990 | Nishio et al. . |
| 4,944,030 | 7/1990 | Haraguchi et al. . |
| 4,951,083 | 8/1990 | Okura et al. ............... 354/485 |
| 4,962,399 | 10/1990 | Numako et al. . |
| 4,964,697 | 10/1990 | Fuziwara ............... 354/485 |
| 4,974,949 | 12/1990 | Tanaka . |
| 5,012,273 | 4/1991 | Nakamura et al. . |
| 5,016,032 | 5/1991 | Haraguchi et al. . |
| 5,029,991 | 7/1991 | Kohno et al. ............... 350/429 |
| 5,043,752 | 8/1991 | Kohmoto . |
| 5,051,764 | 9/1991 | Nomura . |
| 5,079,577 | 1/1992 | Nomura ............... 354/485 |
| 5,099,263 | 3/1992 | Matsumoto et al. . |
| 5,144,493 | 9/1992 | Nomura . |
| 5,164,757 | 11/1992 | Nomura . |

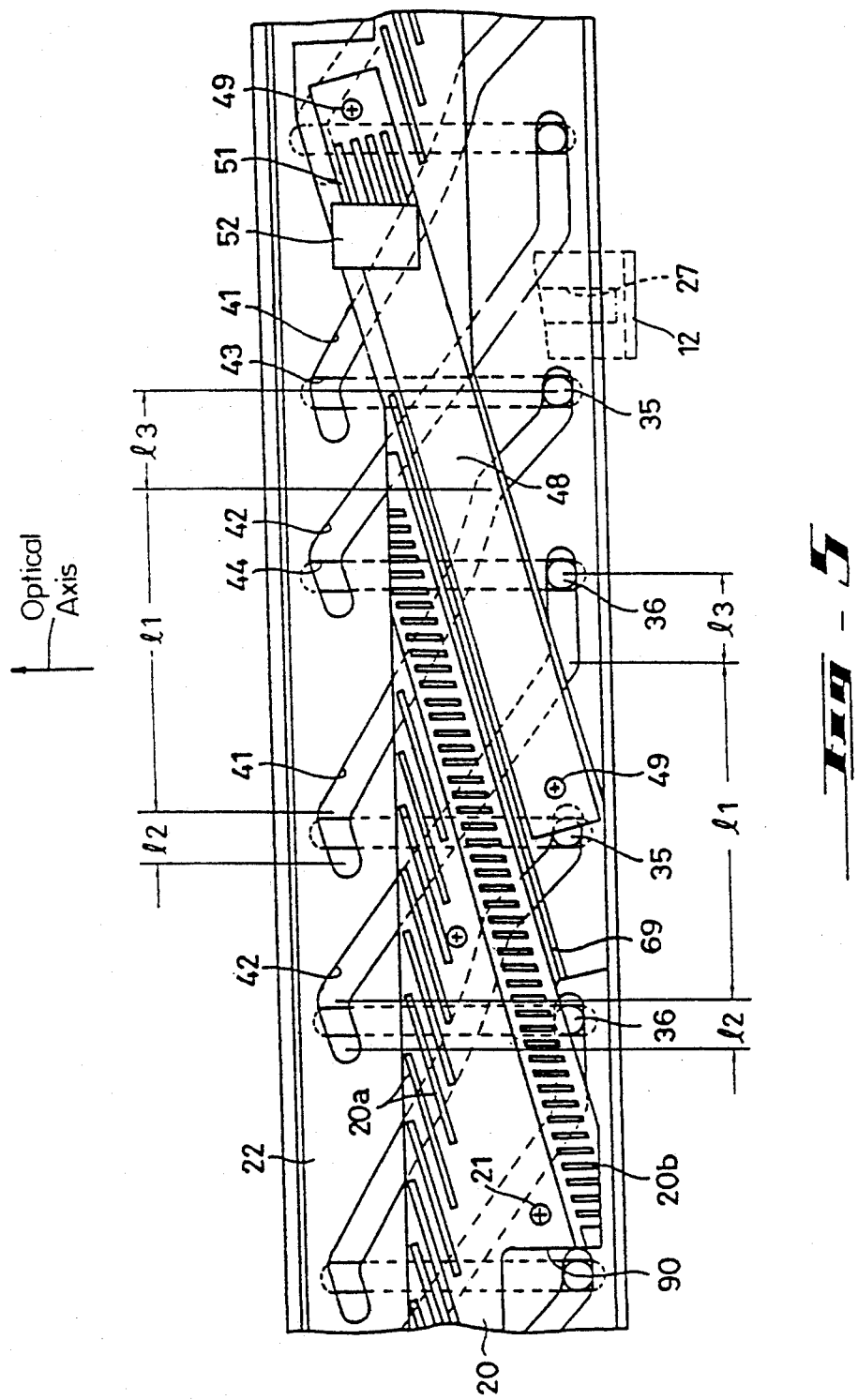

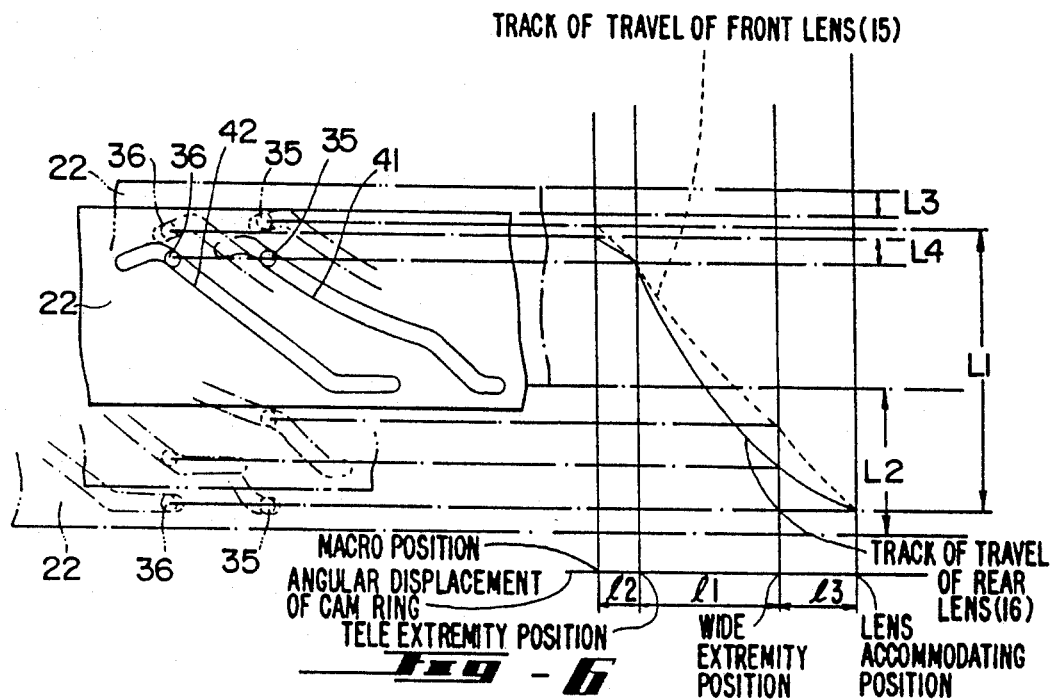
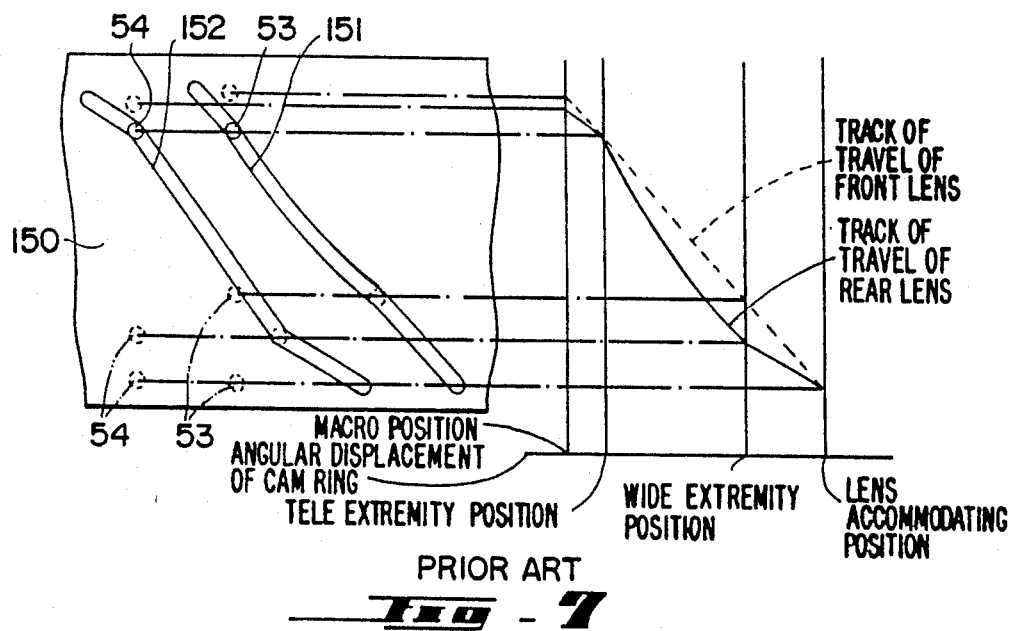
PRIOR ART
Fig-7

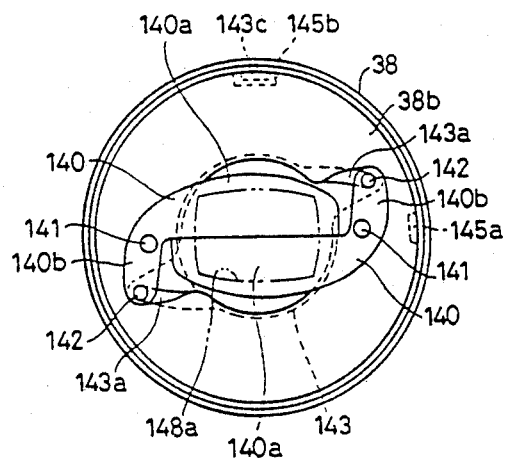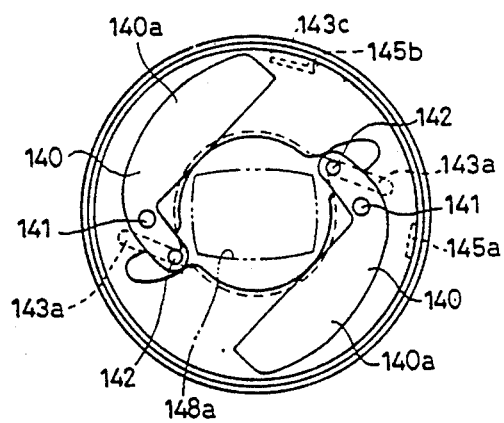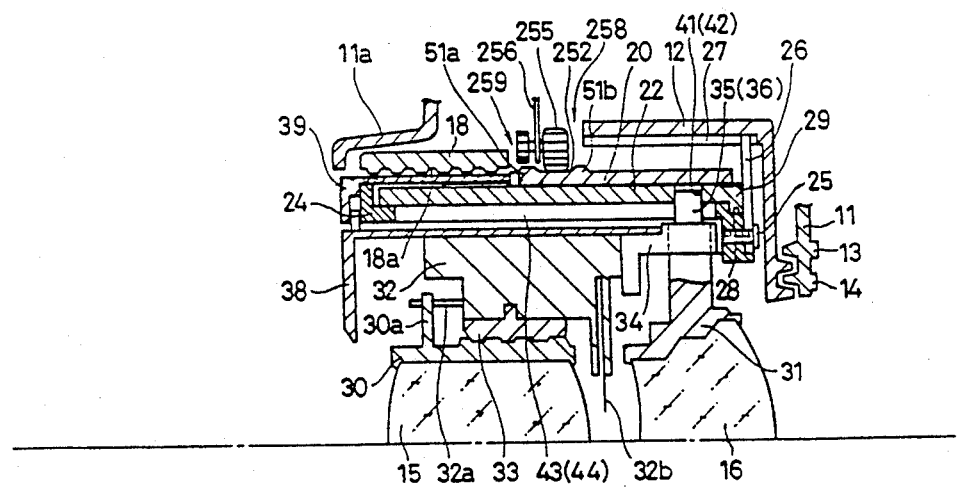

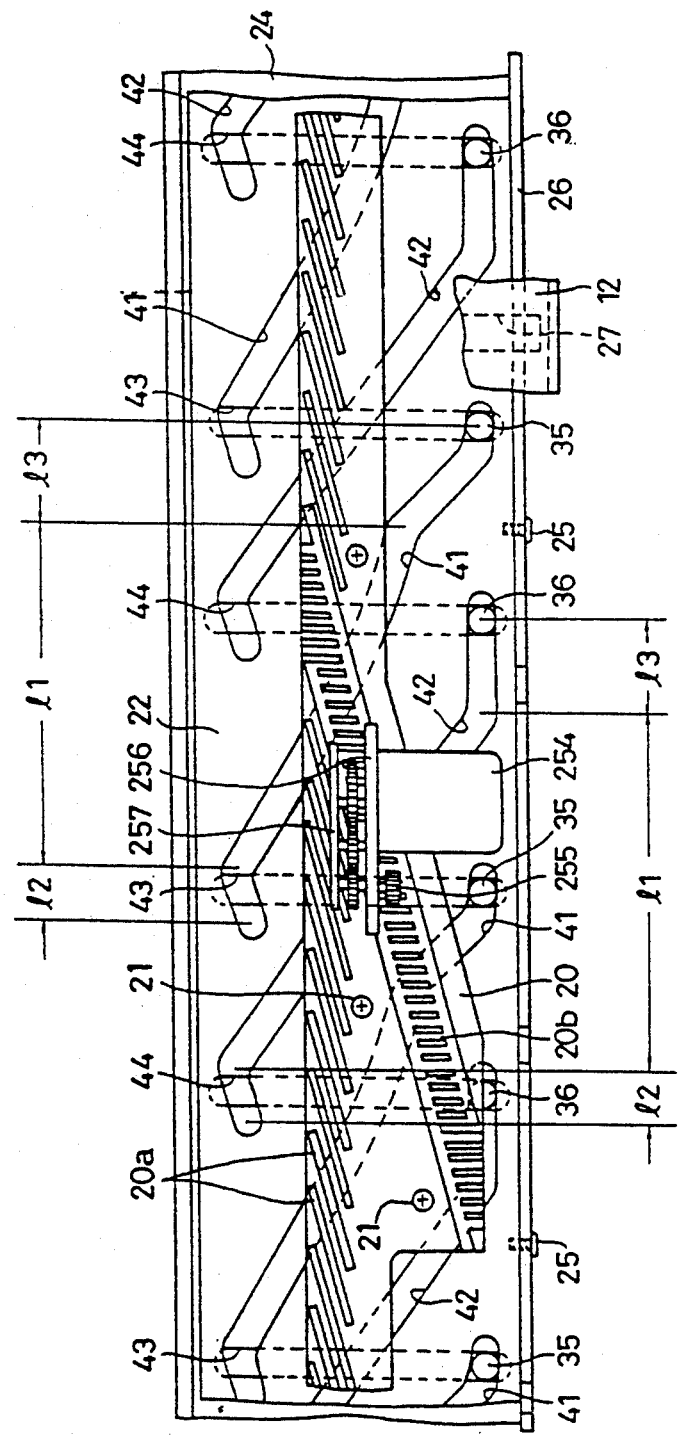

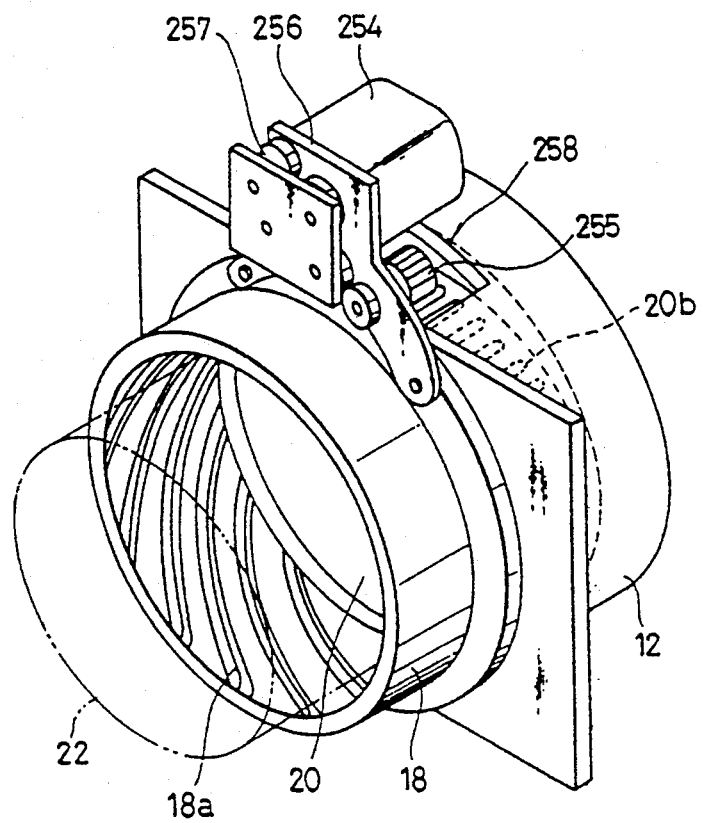

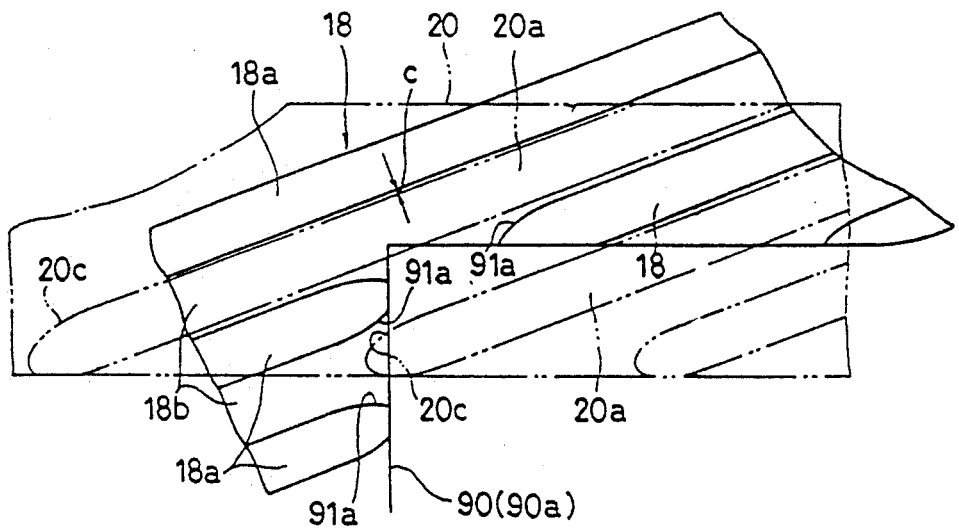
_Fig - 25_
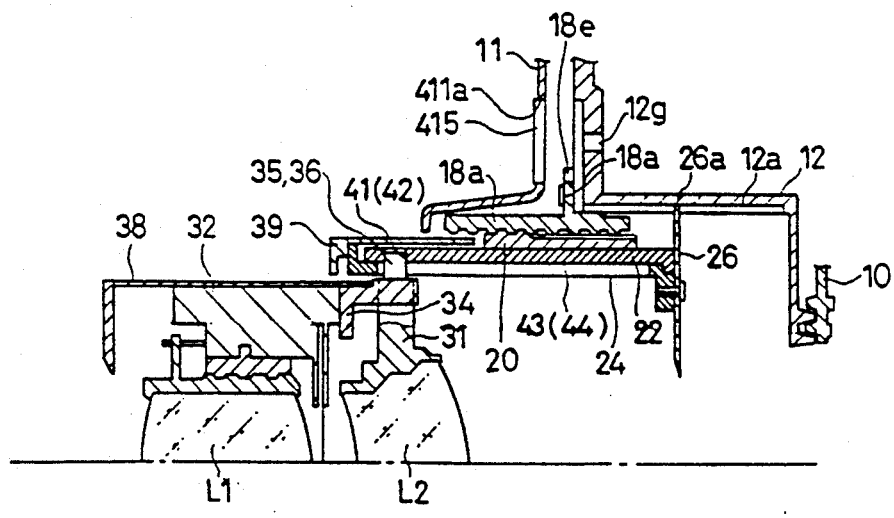
_Fig - 29_

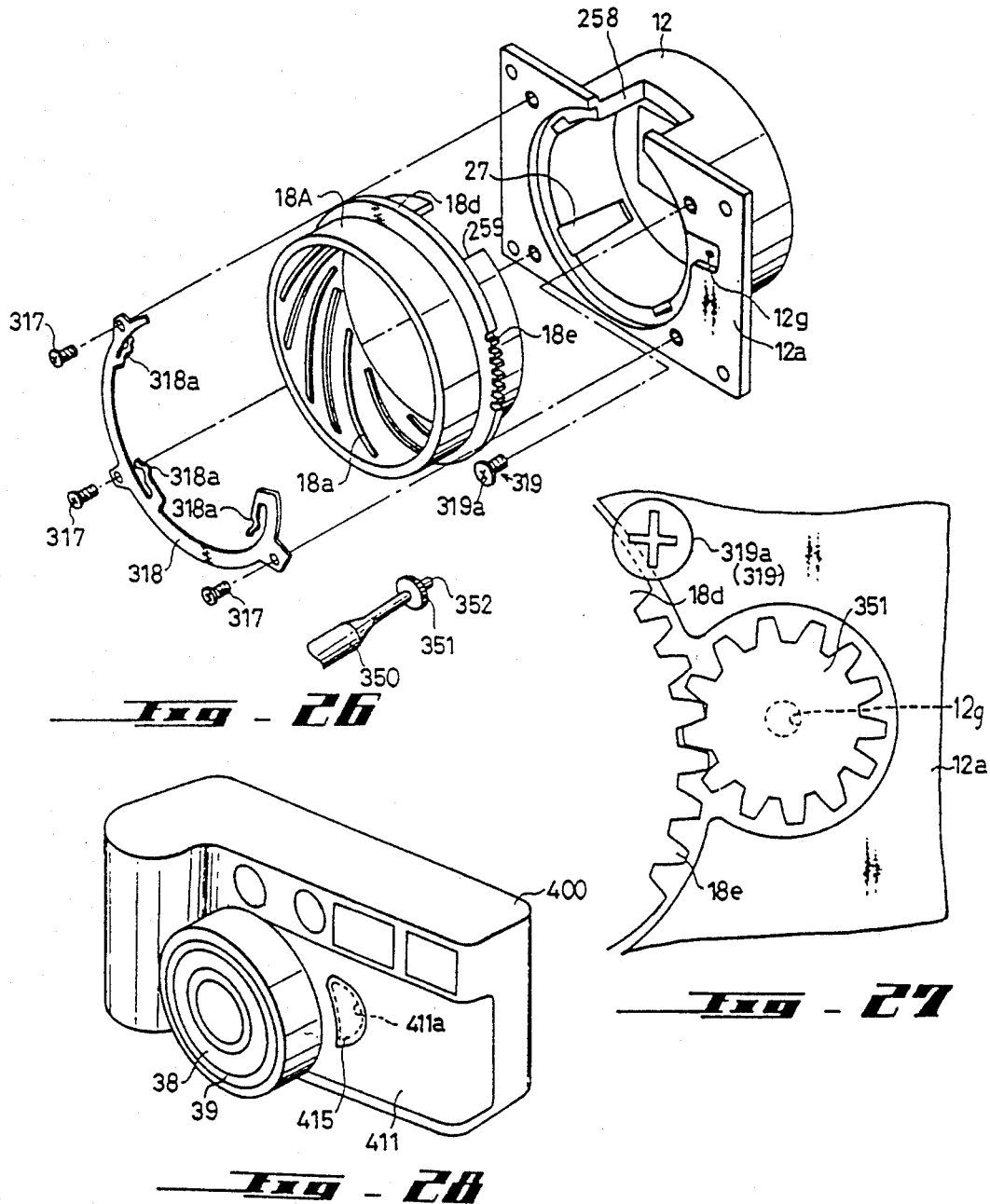

ZOOM LENS BARREL AND CAMERA INCORPORATING SUCH BARREL

This application is a division of application Ser. No. 07/351,632, filed Jun. 2, 1989, now U.S. Pat. No. 5,144,493.

BACKGROUND OF THE DISCLOSURE

1. Field of the Invention

The present invention generally relates to a zoom lens barrel adapted for use in a camera, and more particularly relates to a zoom lens barrel having a reduced lens length, which accordingly, results in reduced camera thickness when the zoom lens barrel is retracted into a camera body to which it is attached.

2. Discussion of Background Information

Recently developed compact cameras have minimized their width and height dimensions to limits which are essentially set by the film size and the camera aperture size. To the contrary, reduction of the thickness of the camera is restricted or limited by the length of the camera lens when retracted into the body of the camera. When retracted, the required length of the lens (hereafter also referred to as the "accommodation length") increases as the displacement of the groups of lenses in the zoom lens increases, resulting in the need to use a longer cam ring to move the lens groups. Thus, if required displacement of the lenses in the lens group is not equal to the desired length of the cam ring, it is possible that even when the lens is retracted, the cam ring will still project outwardly from the camera body, thereby resulting in a relatively large thickness camera.

Thus, one primary object of the present invention is to provide a zoom lens barrel in which the thickness of the camera in which the lens is positioned, when the lens is retracted or accommodated, can be decreased without decreasing the accuracy or precision of movement of the lens.

The present inventor has recognized that one present obstacle or bar to reducing the thickness of the camera is the use of a cam ring which rotates at a fixed axial position to move the lenses in a lens group between a photographing position and a lens accommodating (or retracted) position within a conventional lens barrel. Accordingly, the present invention is at least partially directed to solving the above-noted problem, i.e., it is directed to overcoming and eliminating the above-mentioned obstacle. In other words, the present invention provides a zoom lens structure without using a cam ring which rotates at a fixed axial position.

SUMMARY OF THE INVENTION

The present invention includes, in one aspect, a cam ring which is rotatably supported by a stationary barrel so that the cam ring will move in the optical axis direction in accordance/association with rotation of the cam ring. The cam ring can be provided with at least two cam grooves for front and rear lens groups in order to determine the displacement of the lens groups.

Other aspects of the present invention are set forth in detail hereinafter.

In accordance with a second aspect of the present invention, the present invention provides a zoom lens barrel adapted to be attached to a camera having an optical axis. The zoom lens barrel comprises a stationary barrel and a rotatable cam ring which is supported by the stationary barrel for movement along the optical axis in association with rotation of the cam ring, with the cam ring including at least two cam grooves which are adapted to receive front and rear movable lens groups, wherein the axial positions of the movable lens groups are at least partially determined by the cam grooves.

Helicoidal connecting means are provided for connecting the cam ring and the stationary barrel, which helicoidal connecting means are positioned, in concentric fashion, between the cam ring and the stationary barrel.

Each of the cam grooves includes a zooming section within which the movable lens groups are adapted to be moved along a predetermined track, and a macro-transferring section along which the movable lens groups are adapted to be moved from one extreme zooming position to a macro-photographing range, wherein the zooming section and the macro-transferring section have lead angles which are oppositely disposed to each other with respect to the optical axis.

In accordance with a third aspect of the present invention, a zoom lens barrel is adapted to be attached to a camera having an optical axis. The barrel comprises a stationary barrel, a rotatable cam ring adapted to be supported by the stationary barrel so as to be movable along the direction of the optical axis, in association with rotation of the cam ring, and a lens guide ring which is movable along the optical axis direction. The lens guide ring and the cam ring are adapted to rotate relative to each other in association with axial movement of the cam ring. At least two cam grooves are adapted to receive movable front and rear lens groups, with at least one of the cam grooves being located on the cam ring. At least one lens guide groove is provided on the lens guide ring, and at least one guide pin is adapted to extend through one cam groove and an associated lens guide groove. The cam grooves and the lens guide grooves comprise means for guiding movement of the movable lens groups along a predetermined path in association with axial movement and relative rotation of the cam ring and the lens guide ring. Two of the cam grooves can be located on the cam ring, and the number of lens guide grooves substantially correspond to the number of cam ring cam grooves.

The lens guide ring is supported by the stationary barrel and is linearly movable along the optical axis direction. Each of the lens guide grooves is a straight groove. The barrel further comprises an angular position detecting mechanism which comprises means for detecting the angular position of the cam ring with respect to the lens guide ring, with the angular position detecting mechanism being positioned between the stationary barrel and the cam ring. Helicoidal connecting means are located between the cam ring and the stationary barrel and comprise means for connecting the cam ring to the stationary barrel. The angular position detecting mechanism comprises a code plate which is secured to an outer periphery of the helicoidal connecting means at an angle of inclination which is identical to the angle of inclination of teeth on the helicoidal connecting means, and a brush which is adapted to slidably contact the code plate.

Alternately, the angular position detecting mechanism comprises means for detecting the relative angular position of the lens guide ring and the cam ring, with the angular position detecting mechanism comprising a code plate and a brush slidably engaging the code plate, wherein the mechanism is positioned between the lens guide ring and the cam ring.

The angular position detecting mechanism can also comprise a code plate which is secured to an outer periphery of the cam ring, and a brush which is adapted to slidably contact the code plate. An end plate can be attached to a rear surface of the lens guide ring, with the end plate including at least one bent portion overlying the code plate, the brush being attached to the end plate.

In accordance with a fourth aspect of the present invention, a mechanism is provided for operating a close distance correcting optical element in a lens shutter type of zoom lens camera which has an optical axis and which includes a zoom lens for effecting macro photography, an object distance measuring device having a light emitter, a light receiver, and an optical axis, for detecting an object distance, a close distance correcting optical element which can be retractably positioned in front of the light receiver, and a cam ring for moving the zoom lens between a normal photographing range and a macro-photographing range. The cam ring is connected to a stationary barrel via a helicoid positioned on the cam ring, the optical element being associated with the cam ring helicoid such that the mechanism comprises means for moving the close distance correcting optical element away from the optical axis of the light receiver when the zoom lens is located in the normal photographing range, and for bringing the close distance correcting optical element into the optical axis of the light receiver when the zoom lens is located in the macro photographic range.

A lens guide ring is adapted to move along the optical axis of the camera together with the cam ring, the cam ring being rotatable with respect to the lens guide ring in association with axial movement of the cam ring and the lens guide ring. Further, a light intercepting plate is positioned on a rear end of the lens guide ring, the plate comprising means for preventing harmful light from reaching a film plane of the zoom lens camera. The lens guide ring can include a linear movement guide plate which is adapted to be movably guided along the optical axis direction by an inner surface of the stationary barrel, wherein the light intercepting plate comprises an extension of the linear movement guide plate which extends towards the camera optical axis.

In accordance with a fifth aspect of the present invention, a flexible printed circuit board is adapted for use in a lens shutter type of zoom lens camera having an optical axis and a stationary barrel attached to a camera body, a rotatable cam ring which is adapted to be supported by the stationary barrel so as to move along the direction of the optical axis of the camera in accordance with rotation of the cam ring, a lens guide ring which is adapted to move together with the cam ring along the optical axis direction, wherein the cam ring is adapted to rotate relative to the lens guide ring in accordance with axial movement of the cam ring, at least two movable front and rear lens groups which are adapted to be supported on the cam ring and lens guide ring so as to move along the optical axis direction along a predetermined track in association with axial movement and relative rotation of the cam ring and the lens guide ring in order to change the focal length of the zoom lens, a shutter block adapted to move together with the movable lens groups along the optical axis direction, and a control circuit associated with the camera body, which control circuit comprises means for driving and controlling the shutter block. The flexible printed circuit board comprises means for electrically connecting the shutter block and the control circuit, the flexible printed circuit board having at least one portion extending rearwardly, within the barrel, from the control circuit to a rear end of the lens guide ring; and the circuit board has a second portion extending forwardly along an inner surface of the lens guide ring, the second portion being connected to the at least one portion, wherein a third portion of the flexible printed circuit board extends rearwardly from the second portion to superimpose the second and third circuit board portions. A fourth portion of the flexible printed board extends forwardly to connect the circuit board to the shutter block, wherein the third and fourth flexible printed circuit board portions are connected to each other.

At least one portion of the flexible printed circuit board is positioned within a flexible printed circuit board guide groove located along the inner surface of the lens guide ring, the groove extending along the camera optical axis direction; and, the at least one portion of the board can be attached to an inner surface of the lens guide ring. The flexible printed circuit board guide groove can have a flat base surface, and the flexible printed circuit board can be secured to a rear end of the lens guide ring. Further, the flexible printed circuit board is adhered or otherwise connected to the flexible printed circuit board guide groove at least along a portion of the flexible printed circuit board that extends forwardly from the lens guide ring.

In accordance with a sixth aspect of the present invention, a zoom lens having a barrier apparatus includes a stationary barrel secured to a camera body having an optical axis. The zoom lens comprises: a rotatable cam ring which is supported by the stationary barrel for movement along the optical axis direction, in association with rotation of the cam ring; a lens guide ring which is adapted to move together with the cam ring along the optical axis direction, wherein the cam ring and the lens guide ring are adapted to rotate relative to each other in association with axial movement of the cam ring; at least two movable front and rear lens groups which are supported on the cam ring and the lens guide ring for movement in the optical axis direction along a predetermined track in association with axial movement and relative rotation of the cam ring and the lens guide ring so as to comprise means for changing the focal length of the lens groups within a zoom photographing range, the lens groups being movable between a lens accommodation position in which the movable lens groups are completely retracted, and a photographing position in which a picture is adapted to be taken; a cylindrical lens cover which is adapted to move, in association with the lens groups, along the optical axis direction; at least one barrier in the lens cover which is (are) adapted to open and close a photographic opening located forwardly of the movable lens groups; and a barrier opening and closing mechanism positioned in the lens cover and comprising means for opening and closing the barriers in association with relative movement of the lens guide ring and the lens cover.

The barriers comprise a pair of barriers which are rotatably mounted on the lens cover via respective pivot pins, positioned on the lens cover along a plane which is perpendicular to the optical axis. The barrier opening and closing mechanism can comprise a ring member which is adapted to rotate in a plane which is perpendicular to the optical axis in order to open and close the pair of barriers, and an association member which rotates the ring member in association with relative movement of the lens cover and the lens guide ring along the optical axis direction.

In accordance with a seventh aspect of the present invention, a zoom lens barrel is adapted to be used in a camera having an optical axis, the zoom lens barrel having a stationary barrel and an inner surface with a plurality of guide grooves for receiving a lens guide ring. The lens guide ring includes a guide plate attached to the lens guide ring having guide projections which are adapted to be fitted into the guide grooves, wherein at least one of the guide projections is elastically deformable in the direction of the width of the barrel guide grooves. A rotatable cam ring is adapted to be supported by the stationary barrel so as to move along the optical axis direction in association with rotation of the cam ring, with the lens guide ring being adapted to be moved together with the cam ring along the optical axis direction. The lens guide ring and the cam ring are provided with grooves for receiving at least front and rear movable lens groups, the movable lens groups each having guide pins which extend through the cam ring grooves and the lens guide ring grooves. The grooves are shaped so as to comprise means for moving the lens groups along a predetermined track in association with axial movement and relative rotation of the cam ring and the lens guide ring. Each of the guide grooves can be a straight groove.

In accordance with an eighth aspect of the present invention, a drive mechanism for a zoom lens comprises a stationary barrel which is adapted to be secured to a camera body having an optical axis, with the barrel including a female helicoid. A cam ring has a male helicoid which is adapted to be engaged by the female helicoid, and a cam ring gear extends along teeth of the cam ring male helicoid. A cam ring driving mechanism has a driving gear which is adapted to be engaged by the cam ring gear, and a lens guide ring is adapted to move, together with the cam ring, along the optical axis direction, wherein the lens guide ring and the cam ring are adapted to rotate, relative to each other, in association with axial movement of the cam ring. At least two movable lens groups which are adapted to be supported by the cam ring and the lens guide ring to move with respect to each other along the optical axis direction, in association with axial movement and relative rotation of the cam ring and the lens guide ring along a predetermined track, to thereby comprise means for changing the focal length of the zoom lens.

The male helicoid includes a plurality of threads, and the cam ring gear is located between adjacent male helicoid threads. The cam ring gear and the driving gear have tooth traces which extend along the optical axis direction, and the front and rear end edges of the driving gear can be rounded or chamfered.

In accordance with a ninth aspect of the present invention, a zoom lens barrel comprises a stationary barrel having a female helicoid and a rotatable barrel having a male helicoid which is adapted to be engaged by the female helicoid. The female helicoid has a cutaway portion for separating engagement of the male and female helicoid at a predetermined angular position of the rotatable barrel, wherein at least one of the female and male helicoids have teeth which are adjacent to the cutaway portion, the adjacent teeth have end faces with tapered surfaces which gradually increase the width of at least one helicoid groove defined by the adjacent teeth. The end faces of the helicoid teeth have tapered surfaces which comprise means for decreasing the height of the helicoid teeth in a direction towards the cutaway portion, and each helicoid groove increases in width in a direction towards the cutaway portion.

In a with a tenth aspect of the present invention, a zoom lens is provided which comprises a stationary barrel which is adapted to be secured to a camera body having an optical axis. A cam ring is supported by the stationary barrel for movement along an optical axis direction of a camera, in association with rotation of the cam ring. A lens guide ring is adapted to move together with the cam ring along the optical axis direction, the cam ring and the lens guide ring being adapted to rotate relative to each other in association with axial movement of the cam ring. At least two movable lens groups are adapted to be supported by the cam ring and the lens guide ring to move, with respect to each other, along the optical axis direction in association with axial movement and relative rotation of the cam ring and the lens guide ring along a predetermined track, so as to comprise means for changing the focal length of the zoom lens. Further, a flange back adjusting mechanism comprises an outer ring adapted to be attached to the stationary barrel, between the barrel and the cam ring, with the outer ring being rotatably adjustable, the mechanism further comprising means for threadably engaging the outer ring with the cam ring.

The outer ring includes an outwardly projecting flange which is adapted to lie in a plane perpendicular to the optical axis, the flange having a circumferential edge and a sector gear attached to the circumferential edge, the stationary barrel including a stationary flange which is adapted to be brought into slidable contact with the outer ring flange. The stationary flange includes a shaft bore into which a shaft of a flange adjusting tool is adapted to be inserted; the adjusting tool shaft has a front end and an adjusting gear attached to the front end, the adjusting gear being adapted to be engaged by the sector gear. The lens is used in combination with a camera body having an aperture into which the flange back adjusting tool is adapted to be inserted.

Alternately, the stationary flange includes an adjusting gear which is adapted to be engaged by a sector gear on the outer ring, the adjusting gear being adapted to be rotated by exterior operation. In this case, the adjusting gear is frictionally positioned on a shaft which is attached to the stationary flange. The lens can be used in combination with a camera body having an aperture into which a flange back adjusting tool for rotating the adjusting gear is adapted to be inserted. The outer ring comprises a helicoid ring with an inner periphery having helicoid teeth. The cam ring has an attached helicoid ring having an outer periphery with helicoid teeth which are adapted to be engaged by helicoid teeth on the outer ring. The lens guide ring is movable together with the cam ring along the optical axis direction; the movement can be together, and/or over substantially equal distances along the optical axis direction.

In accordance with an eleventh aspect of the present invention, a zoom lens is adapted for use with a camera having an optical axis. The zoom lens comprises a cam ring and at least one lens, the cam ring being rotatable and movable linearly along the direction of the optical axis, wherein the cam ring comprises means for moving the at least one lens along the optical axis. The cam ring has an outer periphery and a cam ring gear positioned about the outer periphery.

The cam ring outer periphery is generally cylindrical, and the gear is positioned at a predetermined angle of inclination about the cam ring outer periphery. The cam ring gear is spirally positioned about the cam ring outer periphery, and includes a plurality of teeth, the teeth being substantially parallel to the optical axis of the camera.

The cam ring is generally cylindrical, with a substantially circular cross-section, the cam ring gear being inclined with respect to the cross-section. The lens further comprises a stationary barrel, the cam ring being rotatably positioned within the stationary barrel. The cam ring gear is rotatably driven by a gear train, with the gear train being driven by a motor; and the cam ring outer periphery includes means for rotatably attaching the cam ring to the stationary barrel.

The means for rotatably attaching the cam ring to the stationary barrel comprise two helicoidal rings positioned concentrically between the cam ring and the stationary barrel. The two helicoidal rings comprise a first helicoidal ring attached to the cam ring outer periphery, and a second helicoidal ring positioned concentrically about the first helicoidal ring. The first helicoidal ring has male helicoidal threads positioned about its outer periphery, and the second helicoidal ring has female helicoidal threads positioned on an inner peripheral surface of the second helicoidal ring, the male and female threads being adapted to threadably engage each other to comprise means for rotating the two helicoidal rings with respect to each other.

The means for rotatably attaching the cam ring to the stationary barrel can comprise a first concentric ring attached to the outer periphery of the cam ring, the first concentric ring being linearly and rotatably movable with the cam ring. The first concentric ring has a gear having a plurality of parallel teeth positioned about an outer periphery of the concentric ring; and the first concentric ring is generally cylindrical, and the gear is positioned at a predetermined angle about the outer periphery of the first concentric ring; and the first concentric ring can include a plurality of parallel helicoidal threads positioned at a predetermined angle about the outer periphery of the first concentric ring, the predetermined angle being equal to the predetermined angle of the gear, such that the gear and the helicoidal threads are substantially parallel to each other. The gear has a plurality of teeth which are substantially parallel to optical axis of the camera.

The cam ring can have at least one cam ring groove which has at least one groove section which is inclined with respect to the optical axis. The at least one cam ring groove comprises at least part of the means for moving the at least one lens along the optical axis, such that when the cam ring is rotated, it moves the at least one lens along the optical axis, and when the cam ring is moved linearly, it also moves the at least one lens along the optical axis.

The at least one lens comprises a first lens group, and can be positioned within a shutter block, with a cam ring groove-engaging pin being connected to the shutter block. The shutter block is connected to the pin via a front lens holding frame. The at least one lens comprises first and second lens groups, each of the lens groups being positioned within a frame having at least one pin connected to the frame, each of the lens groups thereby being guided by at least one pin along a respective cam ring groove. The lens can further comprise a lens guide ring positioned concentrically within the cam ring.

The lens guide ring is linearly movable along the optical axis direction, and includes at least one lens guide groove for receiving a pin attached to one of the lens groups, each the lens guide groove being linear and substantially parallel to the optical axis direction. The lens guide ring can thus include a plurality of lens guide grooves, each of the lens guide grooves being linear and adapted to receive a pin attached to a respective lens group.

Each cam ring groove has at least three sections for guiding movement of the at least one lens, the three sections comprising a zooming section for moving the at least one lens along a predetermined track, a macro transfer section for moving the at least one lens from an extreme zooming position into a macro-photographing position, and a lens accommodation section in which the at least one lens is moved into an inoperative, retracted position; and the zooming groove section and macro-transfer groove section are inclined in opposite directions with respect to the optical axis and each other. The at least one lens comprises at least first and second lens groups, each of the lens groups being movably guided by a substantially similar cam ring groove. The cam ring grooves have similar, but not identical, inclinations with respect to the optical axis.

A lens guide ring can be positioned concentrically within the cam ring, the lens guide ring including at least one lens guide ring groove for guiding movement of at least one lens. The cam ring and lens guide ring can be relatively rotatable, such that the cam ring can be rotatable and the lens guide ring not rotatable. Both the cam ring and the lens guide ring are linearly movable along the optical axis direction, wherein the cam ring and the lens guide ring can be linearly movable together along the optical axis direction. In fact, the cam ring and the lens guide ring can be linearly movable together, over substantially equal distances, along the optical axis.

Each at least one lens guide ring groove can be substantially linear, and substantially parallel to the optical axis; and each at least one lens guide ring groove is provided for guiding each lens group.

The cam ring includes a plurality of grooves, with each at least one lens comprising first and second lens groups, and a linearly movable lens guide ring positioned within the cam ring, with the lens guide ring including a plurality of lens guide ring grooves. Each lens group has at least one pin indirectly connected to the lens group, with each the pin being slidably engaged within one lens guide ring groove and one cam ring groove. The cam ring grooves have sections at various angles of inclination with respect to the optical axis, and the lens guide ring grooves are substantially parallel to the optical axis.

The rotatable cam ring engages an adjacent concentric ring which is rotatable with the cam ring, with the adjacent concentric ring positioned about the exterior periphery of the cam ring. The rotatable cam ring is positioned concentrically about a linearly movable ring having at least one groove, with each the groove being substantially parallel to the optical axis. The linearly movable ring comprises a lens guide ring, with the lens guide ring having a rear edge to which a guide plate is attached so as to form an annular groove between the guide plate and the lens guide ring. The cam ring has a generally annular flange positioned within the annular groove. The each linearly movable ring groove comprises means for movably guiding at least one lens along the optical axis.

The linearly movable ring has at least two grooves, the at least one lens comprising first and second lens groups, each lens group being movably guided by a respective linearly movable ring groove; each linearly movable ring groove is substantially parallel to the optical axis. The linearly movable ring has a rear surface and a guide plate attached to the rear surface, with the guide plate comprising means for guiding linear movement of the linearly movable ring. The guide plate has one edge guided by a groove along the inner periphery of a stationary barrel positioned exteriorly of the cam ring, and a light intercepting plate extending from an inner edge of the guide plate. The at least one lens comprises front and rear lens groups, with the front lens group being movably guided by a cam groove in the cam ring. The rear lens group is movably guided by at least one groove in at least one substantially linearly movable member. The at least one linearly movable member comprises a ring, concentrically positioned within the cam ring, having a substantially linear groove which is substantially parallel to the optical axis. The concentrically positioned ring can be formed so as to be non-rotatable.

The at least one linearly movable member can comprise a rotatable ring having a cam groove for receiving a pin attached to the rear lens group, the cam groove being at least partially inclined with respect to the optical axis. The at least one linearly movable member can comprise a cam ring.

The rear lens group is positioned in a frame having a pin attached to the frame, the pin engaging a linear groove in one linearly movable member, with the linear groove being substantially parallel to the optical axis. An inclined cam groove is positioned in a second linearly movable member, the linearly movable members being concentrically arranged. The first linearly movable member comprises a lens guide ring, and the second linearly movable member comprises the cam ring. The at least one lens can comprise front and rear lens groups, with the the cam ring being concentrically positioned about a linearly movable and non-rotatable ring which is adapted to guide at least the rear lens group. The non-rotatable ring comprises a lens guide ring for linearly guiding movement of both of the front and rear lens groups.

The lens can include means for detecting the relative angular position of the cam ring with respect to the non-rotatable ring, and comprises a stationary barrel for housing lens groups, the cam ring, and the non-rotatable ring. The detecting means are positioned between an inner surface of the stationary barrel and an outer surface of the non-rotatable ring, and can comprise a zoom code plate with conductive and non-conductive areas, and a brush adapted to slidably contact the zoom code plate. The zoom code plate can be attached to one of the rings. The one ring can be a cam ring, and the brush can be attached to an extension of the non-rotatable ring. The extension comprises, e.g., a bent portion of a plate attached to a rear end of the non-rotatable ring. Alternatively, the one ring can be the cam ring, and the brush can be attached to the non-rotatable ring. The zoom code plate can be attached to an inner surface of the cam ring, and the to an exterior surface of the non-rotatable ring.

A helicoidal ring can be positioned exteriorly of the cam ring, and the zoom code plate can be positioned, at a predetermined angle of inclination, about an exterior surface of the helicoidal ring.

In accordance with a twelfth aspect of the present invention, a zoom lens is adapted for use with a camera having an optical axis, the zoom lens comprising a cam ring and at least one lens, the cam ring having a peripheral surface, at least one cam groove, and a cam ring gear positioned about the peripheral surface, the cam ring being generally cylindrical, with a generally circular cross-section, and the gear being inclined with respect to the cross-section.

The cam ring gear is positioned in a spiral-like configuration about the peripheral surface of the cam ring, and can have a plurality of teeth which are generally parallel to the optical axis of the camera. The lens can comprise front and rear lens groups, and the cam groove comprises means for receiving a pin which is connected to at least one of the lens groups. At least one of the lens groups comprises both the front lens group and the rear lens group. The cam ring is rotatable and linearly movable along the optical axis direction, in association with rotation of the cam ring. The cam ring gear is positioned on a first helicoidal ring attached to the periphery of the cam ring, the first helicoidal ring including a plurality of generally male threads on an outer surface of the first helicoidal ring. The lens further comprises a second helicoidal ring which has female threads on an interior surface, the female threads being adapted to threadably engage the male threads of the first helicoidal ring; and a stationary barrel positioned about the cam ring, with a motor for driving the zoom lens.

A driving gear is driven by the motor, the driving gear comprising means for driveably engaging the cam ring gear. The barrel a window for exposing the cam ring gear, the driving gear engaging the cam ring gear through the window.

In accordance with a thirteenth aspect of the present invention, a zoom lens is adapted for use with a camera having an optical axis. The zoom lens includes a movable front lens group and a movable rear lens group, the lens groups being housed within a stationary barrel, the lens groups being moved along the optical axis in response to linear movement of a ring assembly along the optical axis, the linear movement of the ring assembly being effected by rotational movement of the ring assembly. The ring assembly comprises at least one rotatable ring having at least one groove, at least one of the lens groups having a pin attached to the lens group, the pin being engageable by the at least one groove. The ring assembly further comprises at least one linearly movable ring which is movable only along the optical axis, the linearly movable ring having at least one groove which also engages the pin, the ring grooves together defining a path of movement of the at least one lens group. One of the ring grooves is parallel to the optical axis, and another of the ring grooves is inclined with respect to the optical axis; and the parallel ring groove is positioned on the linearly movable ring, with the inclined groove being positioned on the rotatable ring. The at least one lens group can be, e.g., the rear lens group.

The rotatable ring comprises a generally cylindrical cam ring, with at least one groove being inclined with respect to the optical axis and the periphery of the cam ring, wherein the at least one lens group comprises at least the front lens group. Both of the front and rear lens groups have pins attached to the lens groups, with pins being engaged by respective cam ring grooves. The pins are also engaged by substantially linear grooves, the linear grooves being substantially parallel to the optical axis and being located on a linearly movable, non-rotatable ring which is concentrically positioned within the cam ring. The cam ring an exterior surface a cam ring gear attached thereto, the cam ring gear being inclined with respect to the cam ring periphery. The cam ring gear is part of a helicoidal ring positioned about the cam ring periphery, wherein the helicoidal ring includes a plurality of helicoidal threads which are positioned about the cam ring at substantially the same angle of inclination as the cam ring gear. The inclined groove includes a first section inclined in one direction with respect to the optical axis and a second section inclined in a second, generally opposite direction with respect to the optical axis; and the inclined groove also includes a third section which is substantially perpendicular to the optical axis.

In accordance with a fourteenth aspect, the present invention provides a female helicoid ring adapted for use in a zoom lens camera. The ring comprises a generally cylindrical body, a plurality of generally helical, parallel threads on an interior peripheral surface of the body, a recess on the interior surface, and an electrically conductive brush having a base and a plurality of flexible bristles, the base being attached to the recess.

The recess is inclined at substantially the same angle as the helical threads, and a generally annular flange is attached to the outer periphery of the ring. The threads are female threads.

In accordance with a fifteenth aspect of the present invention, a ring assembly is adapted for use in a camera zoom lens. The ring assembly comprises an inner ring having a plurality of external helicoidal threads thereon, the inner ring having an external gear positioned on the ring at the same angle as the threads, and an outer ring having a plurality of internal helicoidal threads adapted to threadably engage the external threads, wherein the inner ring can rotate and move axially within the outer ring.

In accordance with a sixteenth aspect of the present invention, an apparatus is provided for selectively positioning correcting optical element used during macrophotography in front of a light receiver of a distance measuring device. The apparatus comprises a generally cylindrical cam ring, the cam ring having a plurality of threads on an exterior cam ring surface, the threads comprising means for selectively engaging the optical element during rotation of the cam ring. The optical element is naturally biased by a spring into a position in front of the light receiver, the optical element having a frame including a projection which is selectively engaged by the cam ring threads. The ring threads are adapted to engage the optical element projection, against the force exerted by the spring, when in a normal photographing position, thereby moving the optical element into a position away from the light receiver when the threads engage the optical element projection. The light receiver and optical element are positioned in a recess on a stationary lens barrel, the recess having a lower opening through which the projection is adapted to extend, such that the projection will selectively engage the threads upon rotation of the cam ring.

In accordance with a seventeenth aspect of the present invention, a flexible printed circuit board assembly is adapted for use in a camera having a zoom lens and an optical axis, the zoom lens including two lens groups, adapted to move along the axis, and the camera including a stationary outer barrel and at least two concentric rings positioned within barrel. A shutter block is adapted for movement with the lens groups along the optical axis, the flexible printed circuit board assembly comprising a flexible printed circuit board for electrically connecting the shutter block to a camera control circuit, the flexible printed circuit board having a first end adapted to be attached to the control circuit, a first portion adapted to extend rearwardly along the inner surface of the barrel, a second portion extending generally forwardly along an inner surface of inner one of the concentric rings, a third portion extending rearwardly so as to be partially superimposed upon the second portion, and a fourth portion flexibly connected to the shutter block. The fourth portion extends forwardly within the barrel and is partially superimposed upon the third flexible printed circuit board portion.

The flexible printed circuit board can be attached at least at one area to an inner one of the concentric rings, with the inner concentric ring having an elongated groove which is generally parallel to the optical axis, with one of the at least one areas being located on the elongated groove. The inner concentric ring has a rear surface on which one of the at least one areas is located.

The inner concentric ring has a front end, with one of the at least one areas being located on the front end. A linear movement guide plate is attached to a rear end of one of the concentric rings, and an additional portion of the flexible guide plate extends rearwardly of the guide plate, between the first and second portions.

In accordance with an eighteenth aspect of the present invention, a flexible printed circuit board assembly comprises an annular lens guide ring adapted to be moved linearly along the optical axis of a camera with which the assembly is used. The annular guide ring has at least one movable lens guide groove and at least one elongated groove for retaining the flexible printed circuit board, and a flexible printed circuit board positioned within the groove. The retaining groove is positioned on an interior surface of the ring, and the flexible printed circuit board is attached to the retaining groove. The assembly further comprises an annular ring movement guiding plate attached to a rear surface of the lens guide ring. The plate includes an extension for preventing light from reaching a film plane of the camera.

In accordance with a nineteenth aspect of the present invention, and apparatus is provided for respectively opening and closing a photographic opening in a lens cover adapted for use with a zoom lens in a camera having an optical axis. The apparatus comprises a rotatable ring, supported by a stationary barrel, for movement along the optical axis direction in association with rotation of the ring, at least two movable lens groups which are movable along the optical axis between a lens retracted position and an operative photographing position, a lens cover adapted to move with the lens groups, and at least one movable barrier in the cover for selectively covering the photographic opening; and a barrier opening and closing mechanism comprising means for opening and closing each barrier when the rotatable ring and the lens cover move along the optical axis direction over different distances with respect to each other. The rotatable ring has at least one elongated opening, and the opening and closing mechanism includes an annular driving ring having a pin which is adapted to ride along one elongated opening. The at least one barrier comprises a pair of barriers which are rotatably mounted to the lens cover, via respective pivot pins positioned on the lens cover, along a plane which is perpendicular to the optical axis; and the opening and closing mechanism includes an annular driving ring member adapted to rotate in order to open and close each barrier. The apparatus further comprises a spring attached to the driving ring member for continuously biasing the driving ring towards a position in which each of the barriers is open. The driving ring further comprises a pin adapted to engage the elongated opening, such that movement of the pin along an inclined surface of the elongated opening overcomes the spring biasing force to close the barriers.

In accordance with a twentieth aspect of the present invention, a lens barrel is adapted to be used in a camera having an optical axis and a zoom lens. The lens barrel comprises a stationary barrel having an inner surface with a plurality of guide grooves which are adapted to receive a member for guiding lens movement. The member includes a guide plate having a plurality of guide projections which are adapted to be fitted into the guide grooves, wherein at least one of the guide projections is elastically deformable to facilitate positioning of the projections within the guide grooves. The lens barrel can be used in combination with the lens movement guiding member; and the lens barrel can have a substantially cylindrical main portion and a substantially flat flange positioned along a front surface of the barrel main portion. An upper portion of each of the flange and the main portion are notched so as to form an opening for receiving a lens-driving motor assembly. The lens movement guiding member comprises a lens guiding ring, and each of the deformable guide projections comprises two fingers separated by a generally radially directed slot. Each of the slots can be generally T-shaped.

In accordance with a twenty first aspect of the present invention, a drive mechanism is provided for a zoom lens which is adapted to be used in a camera having an optical axis. The drive mechanism comprises a stationary barrel having a plurality of helicoidal threads attached to an internal surface of the barrel; a cam ring having an outer surface with a plurality of helicoidal threads adapted to be engaged by the stationary barrel helicoidal threads; a cam ring gear which extends in the direction of the cam ring threads; and a cam ring driving mechanism having a driving gear which is adapted to engage the cam ring gear.

The drive mechanism further comprises a lens guide ring which is adapted to move along the optical axis direction, wherein the lens guide ring and the cam ring are adapted to rotate, relative to each other, in association with axial movement of the cam ring, and at least two movable lens groups which are adapted to be supported by the cam ring and the lens guide ring to move with respect to each other along the optical axis direction, in association with axial movement and relative rotation of the cam ring and the lens guide ring, to thereby comprise means for changing the focal length of the zoom lens. The cam ring gear comprises part of the helicoidal threads of the outer cam ring surface, the cam ring gear being located between adjacent threads. The cam ring helicoidal threads are male threads, and the stationary barrel helicoidal threads are female threads. A female helicoidal ring is attached to the internal surface of the barrel, and a male helicoidal ring is attached to an outer surface of the cam ring. The barrel has an upper window to expose the cam ring gear, and for receiving a motor-driven driving gear for driveably engaging the cam ring gear.

In accordance with a twenty second aspect of the present invention, a zoom lens barrel comprises two rotatable cylindrical members having respective male and female helicoidal threads which are adapted to engage each other upon rotation of one of the cylindrical members, wherein one of the members has a cutaway portion for separating engagement of the male and female threads at a predetermined angular position of the members. The one member has threads which are adjacent to the cutaway portion, the adjacent threads having end faces with tapered surfaces which gradually decrease the width of the adjacent threads and increase the width of a groove defined between the adjacent threads, in a direction towards the cutaway portion. One of the cylindrical members comprises an outer, stationary ring, and the other cylindrical member comprises an inner, rotatable ring. The cutaway portion is on the outer ring, wherein the tapered end faces of the helicoidal threads have tapered surfaces which comprise means for decreasing the height of the helicoidal threads in a direction towards the cutaway portion.

In accordance with a twenty third aspect of the present invention, a zoom lens comprises a stationary barrel which is adapted to be used with a camera having an optical axis, a cam ring supported by the stationary barrel for movement along the optical axis direction, a lens guide ring adapted to move along the optical axis direction, at least two movable lens groups which are adapted to be movably supported by the cam ring and the lens guide ring so as to move, along the optical axis direction, to thereby comprise means for changing the focal length of the zoom lens, and a flange back adjusting mechanism which comprises an outer ring adapted to be attached to the stationary barrel, between the barrel and the cam ring, the outer ring being rotatably adjustable, the mechanism further comprising flange back adjusting means for threadably engaging the outer ring to adjustably rotate the outer ring.

The outer ring includes an outwardly projecting flange which is adapted to lie in a plane perpendicular to the optical axis, the flange having a circumferential edge and a sector gear attached to the circumferential edge, the stationary barrel including a stationary flange which is adapted to slidably contact the outer ring flange. The barrel has a stationary flange with a bore into which a shaft of a flange adjusting tool is adapted to be inserted, with the adjusting tool shaft having a front end and an adjusting gear attached to the front end, the adjusting gear being adapted to be engaged by a sector gear on the outer ring; and the outer ring comprises an inner periphery having helicoidal threads.

The cam ring can have an attached helicoidal ring, the attached helicoidal ring having an outer periphery with helicoidal threads which are adapted to be engaged by the helicoidal threads of the outer ring. The barrel can have a stationary front flange with an adjusting gear frictionally fit onto a shaft which is attached to the front flange.

The outer ring can have an outer flange with a sector gear which is adapted to be engaged by the adjusting gear to rotate the flange; and the shaft can have a head adapted to be engaged by an exterior tool so as to rotate the adjusting gear.

In accordance with a twenty fourth aspect of the present invention, a method is provided for adjusting the position of a group of lenses with respect to a film plane in a camera having an optical axis and a zoom lens with a stationary barrel, movable lens groups which are movably positioned along the optical axis by a rotatable cam ring and a non-rotatable lens guide ring, both of the rings being movable along the optical axis, and male and female helicoidal rings positioned concentrically between the stationary barrel and the cam ring. The method comprises rotating a tool to rotate an adjusting gear which is engaged with a gear sector on the ring flange so as to rotate the one ring. The method further comprises loosening a fastening member before rotating the tool, and tightening the fastening member after rotating the tool.

In accordance with a twenty fifth aspect of the present invention, a zoom lens is adapted for use with a camera having an optical axis, the zoom lens comprising a cam ring movable along the optical axis and at least one lens movable along the optical axis in association with movement of the cam ring along the optical axis so as to vary the focal length of the camera. The cam ring comprises means for moving the at least one lens along the optical axis over a distance greater than the distance over which the cam ring moves along the optical axis. The moving means can comprise at least one cam ring groove, angled with respect to the optical axis, the groove being adapted to engage the at least one lens; and the at least one lens comprises at least one lens group with at least one pin attached to each the lens group, each the pin being slidably engaged within a cam ring groove. The cam ring is preferably rotatable, wherein rotation of the cam ring effects axial movement of the cam ring.

In accordance with a twenty sixth aspect of the present invention, an apparatus is provided for selectively opening and closing a photographic opening in a lens cover adapted for use with a lens in a camera having an optical axis. The apparatus comprises at least one movable barrier and means for selectively covering the opening with the barrier, with the selectively covering means comprising first and second elements which are relatively movable along the optical axis. The first element comprises the lens cover, with the second element comprising a lens guide ring. Each movable barrier is connected to the lens cover, and the cover is attached to a driving ring, such that relative movement of the lens cover and the lens guide ring, along the optical axis, effects rotation of each barrier to selectively cover the photographic opening when the lens is in an inoperative, retracted position within the camera.

With this arrangement of a zoom lens barrel, because the cam ring moves along the direction of the optical axis during rotation of the cam ring, displacement of the lens groups, which is determined by the profiles of the respective cam grooves, can be increased. In this manner, it is possible to shorten the accommodation length of the lens to which the lens group is retracted (beyond the zooming range). This permits the overall thickness of the camera to be desirably reduced.

Another object of the present invention is to provide a light intercepting element which is designed to prevent harmful light from reaching the film plane, particularly when a zoom lens is in its TELE extremity position. This is achieved by providing a light intercepting plate which is formed as a radial extension of a linear movement lens guide plate located rearwardly of the two lens groups.

Yet another object of the present invention is to provide a mechanism for detecting the angular position of a rotatable cam ring. A code plate is used which can be positioned at a desired angle (or perpendicularly) with respect to the optical axis; and the mechanism can be located at several alternate positions within the lens barrel.

Still another object of the present invention is to correct autofocus detection and measurement in a microphotography mode. This is achieved by providing a selectively movable optical element which is rotatably spring biased into a position in front of a light receiving element of an autofocus system, by using the helicoidal threads attached to the outer periphery of a cam ring.

A further object of the present invention resides in a system for guiding movement of a flexible printed circuit board. The FPC board is bent over itself to form several loops, and can be adhesively (or otherwise, e.g., by a mechanical member) connected to camera components at spaced locations. The FPC board is positioned to avoid interfering with camera components and operation.

A still further object of the present invention is to guide movement of a lens guide ring. This can be achieved, e.g., without undue mechanical tolerances, by securing a plate with deformable portions to the guide ring.

Another object of the present invention is to easily open and close a shutter barrier mechanism. This is accomplished via the relative axial displacement, e.g., of a cylindrical lens cover with respect to a lens guide ring, and should be designed to overcome the adverse effects of any errors which occurred during the manufacture and/or assembly of camera components.

Still an additional object of the present invention is to avoid undesirable engagement between threaded rotating components of a camera, by designing tolerances into threaded areas (e.g., by using inclined surfaces) to facilitate threading engagement and to avoid blocking type engagement.

A further object of the invention is to be able to easily provide a focused image on a film plane, e.g., by using a tool for flange back adjustment which can be easily manipulated, even after camera assembly.

According to another aspect of the present invention, a zoom lens barrel is provided which comprises a stationary barrel, a rotatable cam ring which is supported by the stationary barrel to move in an optical axis direction in accordance with rotation of the barrel, and a lens guide ring which moves together with the cam ring along the optical axis direction and which is rotated relative to the cam ring in accordance/association with axial and rotational movement of the cam ring. Cam grooves are provided on the cam ring for each of at least two movable front and rear lens groups. Lens guide grooves are formed on the lens guide ring in order to correspond to the cam grooves of the cam ring, and at least one guide pin is provided which extends through an associated cam groove and an associated lens guide groove. The cam grooves and the lens guide grooves are shaped such that the movable lens groups can be moved along a predetermined track by the movement which results from the axial movement of, and relative rotation between, the cam ring and the lens guide ring.

With such an arrangement, because the cam ring is advanced while rotating, the angle of inclination of the cam grooves can be decreased from what they would need to be if the cam ring only rotated in a single axial position. This contributes to providing for highly precise movement of the lens groups. Specifically, when the zoom lens barrel has a zooming section and a macro transfer section, in which the lens group is moved from one extreme zooming position to the macro-photographing range, the lead angles, i.e., the inclination angles of the cam grooves of the zooming section and the macro-transferring section, can be oriented so that they are opposite to each other with respect to a direction which is parallel to the optical axis.

In accordance with the present invention, because the cam ring and the lens guide supporting the lens groups move the lens groups along the optical axis direction, and because the lens groups can be moved along the optical axis direction by relative movement of the cam ring and the lens guide ring, the accommodation length of the movable lens groups can be shortened, thereby resulting in a camera which is compact, small and thin. Further, in accordance with the present invention, a relatively large axial displacement of the cam ring, resulting from both angular and axial displacement of the cam ring, can be ensured. Additionally, the axial displacement of the movable lens groups relative to angular displacement of the cam ring can be decreased by using a lead angle of the cam groove of the macro-transferring section which is opposite to the direction of that in the zoom section with respect to the optical axis, thereby resulting in more precise movement of the movable lens groups.

Specifically, because the cam ring and the lens guide ring, which rotates relative to the cam guide ring, move along the direction of the optical axis while supporting the lens groups, so that resultant movement of the cam ring and the lens guide ring will effect axial movement of the lens groups, it is possible to increase displacement of the lens groups along the optical axis, in the normal photographing (i.e., zoom) range, even while using a cam ring and lens guide ring with decreased or reduced optical axial lengths; thus, a camera incorporating the same will have a relatively small thickness with an increased photographic (focal length) range. Further, because the cam grooves have opposed lead angles which are inclined in opposite directions with respect to a direction which is parallel to the optical axis of the zooming section and a macro-transferring section, displacement of the lens groups can be decreased in comparison to the angular displacement of the cam ring, thereby resulting in highly precise movement of the lens groups, i.e., greater angular displacement can result in increased precision of resultant axial lens movement.

BRIEF DESCRIPTIONS OF THE DRAWINGS

The above and other objects, features and advantages of the present invention will be discussed in greater detail hereinafter with specific reference to the drawings which are attached hereto, in which like reference numerals are used to represent similar parts throughout the several views, and wherein:

FIG. 5 is a developed or plan view of a cam ring, a lens guide ring, and an inner helicoid ring;

FIG. 6 is an explanatory or schematic view illustrating the relationship between displacement of the cam grooves and the lenses;

FIG. 7 is an explanatory view illustrating the relationship between the cam grooves and the lenses in a known camera, and is labeled as prior art;

FIGS. 19A and 19B are front elevational views of the barrier mechanism illustrated in FIG. 17, corresponding to the views of FIGS. 18A and 18B, respectively;

FIG. 20 is a longitudinal sectional view of a lens barrel driving mechanism as shown in FIGS. 1-4;

FIG. 21 is a developed or plan view of the lens barrel driving mechanism shown in FIG. 20, a cam ring, a lens guide ring, and an inner helicoid;

FIG. 22 is a perspective view of the main portion of a lens barrel driving, mechanism;

FIG. 25 is a developed or plan view of the structure illustrated in FIG. 24;

FIG. 26 is an exploded perspective view of a zoom lens barrel mechanism as shown in FIGS. 1-4, in combination with a flange back adjusting mechanism;

FIG. 27 is a front elevational view of a part of the mechanism of FIG. 26, illustrating adjustment of the flange back using an adjusting tool;

FIG. 28 is a perspective view of a camera having a flange back adjusting mechanism; and FIG. 29 is a longitudinal sectional view of a zoom lens barrel including the flange back adjusting mechanism illustrated in FIG. 26.

DETAILED DESCRIPTION OF THE DRAWINGS

The present invention will now be discussed in greater detail with specific reference to the drawings which are attached hereto.

In the illustrated embodiment, the present invention is used in a zoom lens barrel having a macro photographic function; although many of the features can equally well be used in a camera without such a function. FIGS. 1, 2, 3 and 4 illustrate the lens in a retracted position, a WIDE extremity position, a TELE extremity position, and a MACRO photographing position, respectively. It can thus be easily understood from the drawings of FIGS. 1-4 (and particularly FIG. 1) that the accommodation or retracted length of the lens barrel in accordance with the present invention is small.

Figure 1:
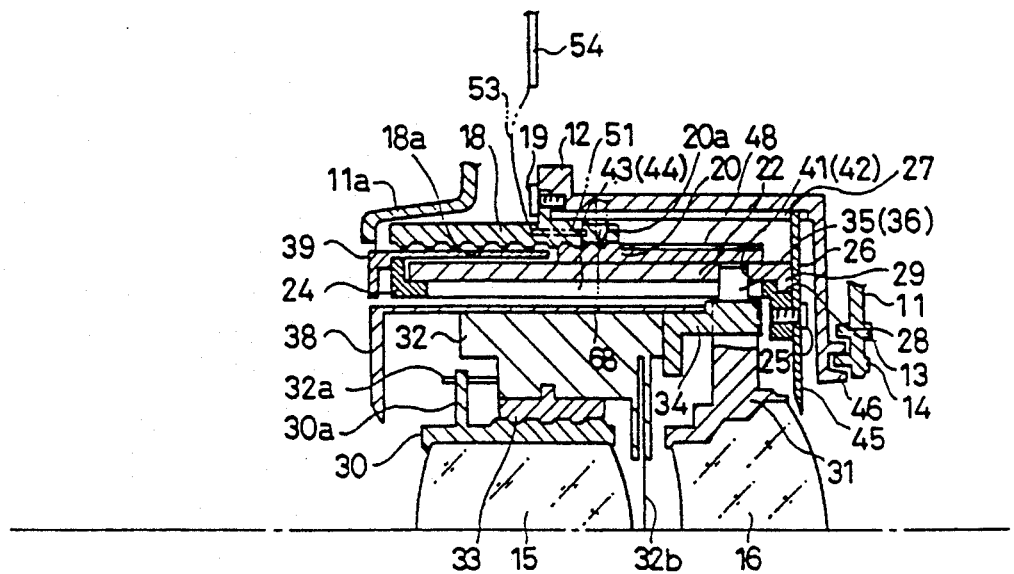
FIG. 1 is a longitudinal sectional view of the upper half of a zoom lens barrel capable of macro-photography, shown in a position in which the lenses are retracted or accommodated, according to one embodiment of the present invention.

As illustrated in FIG. 1, a stationary barrel 12 is secured to a camera body 11, preferably of a lens shutter type of zoom lens camera as disclosed in commonly assigned co-pending U.S. application No. 144,030, the disclosure of which is expressly incorporated by reference herein. The camera body 11 includes an outer rail 13 and an inner rail 14, respectively, which serve as a film guide. Inner and outer rails 13 and 14 further define a film holding plane. In the illustrated embodiment, front and rear lens groups 15 and 16, respectively, can be retracted to, and accommodated within, a position which is very close to the film holding plane. Additionally, annular members such as cam ring 22 are relatively small, and, accordingly, the accommodation length of the camera can be decreased.

A female helicoid ring 18 having inner peripheral helicoid teeth or threads 18a is secured to, and inside of, stationary barrel 12 by set screws 19. The female helicoid ring 18 is screw/threadably engaged by a male helicoid ring 20 having outer peripheral helicoid teeth or threads 20a. Cam ring 22 is secured to male helicoid ring 20 by set screws 21, as illustrated in FIG. 5.

A gear 20b is formed on the outer periphery of male helicoid ring 20; the gear has threads or teeth, each of which extends parallel to the optical axis, as illustrated in FIG. 5. Gear 20b extends at the same angle of inclination as the lead angle of helicoid teeth 20a of male helicoid ring 20, i.e., it is parallel to the direction of each of the teeth or threads 20a, as shown in FIG. 5. Cam ring 22 is rotated in both forward and reverse directions by a driving motor, described in detail hereinafter, through a pinion which meshes with gear 20b, so that when the male helicoid ring 20 is rotated, cam ring 22 is moved in the optical axis direction in accordance with the lead angle of helicoid teeth 20a, all while the cam ring is rotating.

Figure 16:
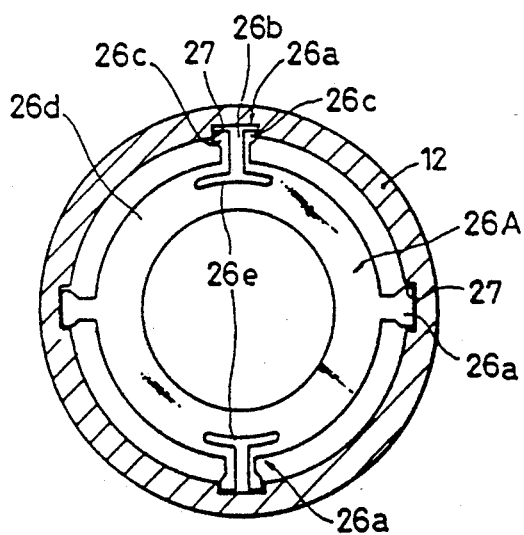
FIG. 16 is a cross-sectional view of the mechanism of FIG. 15.

Lens guide ring 24 is fitted into the inner periphery of cam ring 22 so as to move together cam ring 22 along the optical axis direction, and so that it will rotate relative to cam ring 22. Lens guide ring 24 includes a linear movement guide plate 26 which is secured to the rear end of the lens guide ring 24 by set screws 25. Linear movement guide plate 26 includes at least one outer projection which are each engaged in a respective lens guide ring guide groove 27 formed on the interior surface of stationary barrel 12. As one example, four projections and grooves are shown in FIG. 16. Each guide groove 27 is provided in the form of a straight groove, which extends along (i.e., parallel to) the optical axis direction in the embodiment which is shown in the figures.

An annular groove 28 is provided between the linear movement guide plate 26 and the rear end of lens guide plate 24; an inner flange 29 on the rear end of cam ring 22 is relatively rotatably fitted within annular groove 28, so that lens guide ring 24 can move along the optical axis direction together with movement of cam ring 22. Guide ring 24 cannot, however, rotate, due to the presence of guide groove(s) 27, which engages plate 26 to prevent rotation. Cam ring 22 can, of course, rotate relative to (and about) lens guide ring 24.

Figure 2:
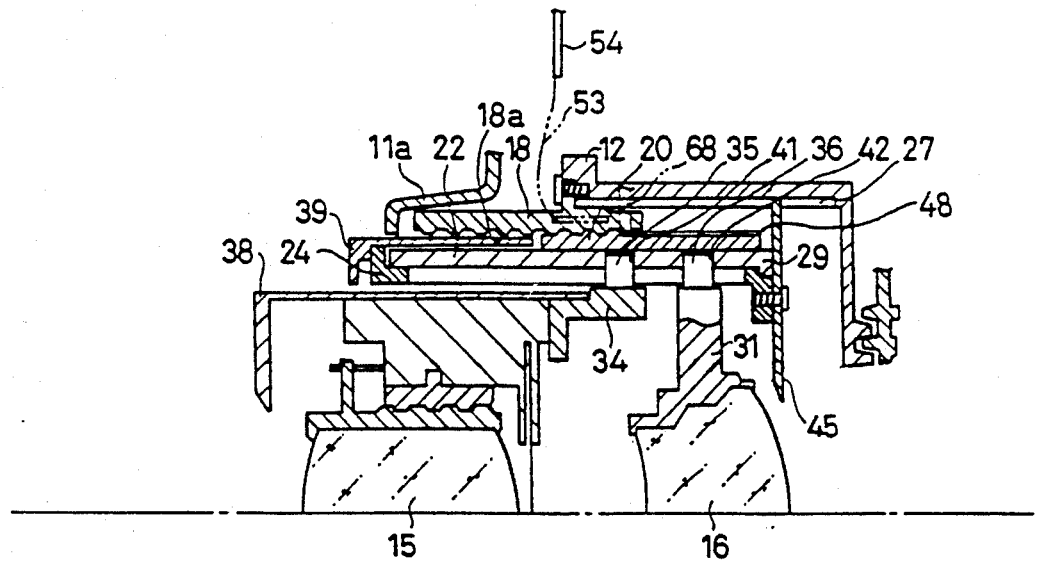
FIG. 2 is a view which is similar to FIG. 1, with the apparatus shown at a WIDE extremity position.
Figure 3:
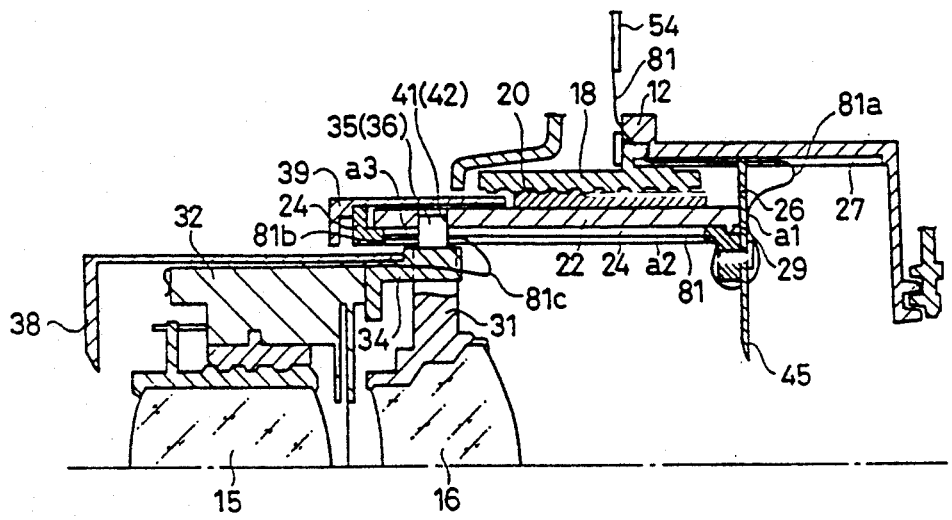
FIG. 3 is a view similar to FIG. 1, with the apparatus shown at a TELE extreme position.
Figure 4:
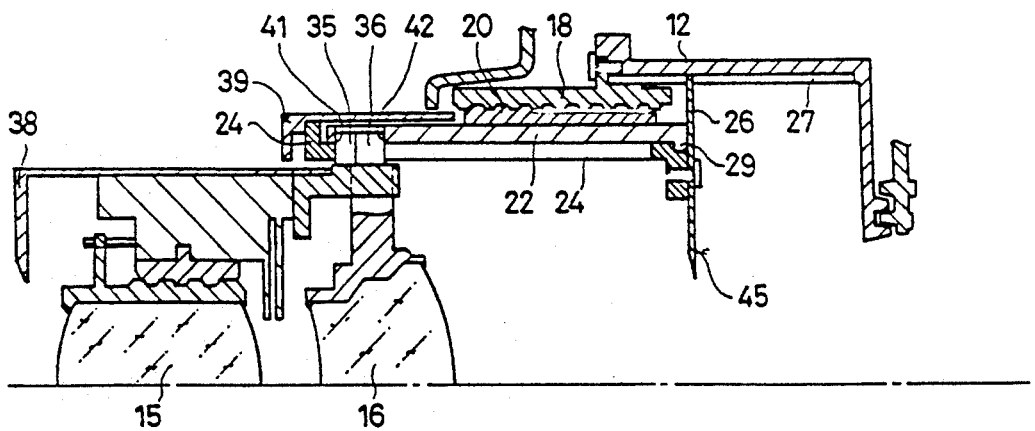
FIG. 4 is a view similar to FIG. 1, with the apparatus shown at a MACRO photographing position.

Front and rear lens groups 15 and 16 are secured to front lens group frame 30 and rear lens group frame 31, respectively, which are both located inside the lens guide ring 24. Front lens group frame 30 is connected to helicoid ring 33, which is itself secured to shutter block 32. The shutter block is secured to a front lens group moving frame 34, which is provided along its outer periphery with at least three guide pins 35. Rear lens group frame 31 is provided along its outer periphery with at least three guide pins 36. As illustrated in FIGS. 1 and 3, the guide pins are shown at the same axial positions, thereby making it possible to show only one such pin; FIGS. 2 and 4, however, illustrate the pins at axially spaced positions (as does, e.g., FIG. 17).

Shutter block 32 rotates driving pin 32a over an angular displacement corresponding to an object distance which is detected by an object distance measuring device (not illustrated) in order to rotate the front lens group frame 30, which is associated with driving pin 32a, via pin 30a. In this fashion, front lens group frame 30 is moved along the optical axis direction in accordance with movement of the helicoid in order to effect focusing, in a well-known fashion. Shutter block 32 also operates shutter blades 32b in accordance with a signal representing the brightness of an object which has been detected.

A cylindrical lens cover 38 is provided which is integral with front lens group moving frame 34, and a decorative cylinder 39 is provided which covers the outer peripheries of lens guide ring 24 and cam ring 22, which are adapted to respectively project from the outer shell 11a of the camera body.

Cam ring 22 is provided with a front lens group cam groove 41 and a rear lens group cam groove 42 within which guide pins 35 and 36, respectively, are fitted. Lens guide ring 24 is provided with lens guide grooves 43 and 44 which, respectively, correspond to the front lens group cam groove 41 and the rear lens group cam groove 42. As shown in the embodiment of FIGS. 1-4, lens guide grooves 43 and 44 are straight grooves which extend in the direction of the optical axis. Guide pin 35 extends through both the front lens group cam groove 41 and the lens guide groove 43, and guide pin 36 extends through both the rear lens group cam groove 42 and the lens guide groove 44.

The profiles of front lens group cam groove 41, lens guide groove 43, and rear lens group cam groove 42, as well as lens guide groove 44, are determined such that movable lenses or lens groups 15 and 16 are moved along a predetermined axial track in accordance with the axial movement of cam ring 22 and lens guide ring 24 effected by rotation the male helicoid ring and by relative rotation of cam ring 22 with respect to lens guide ring 24.

As shown in FIG. 5, the section l 1 of the front lens group cam groove 41 and the rear lens group cam groove 42 represents the normal photographing range (i.e., the zooming section), section l 2 represents the MACRO transferring section, which is connected to the TELE extremity position of zooming section l 1, and section l 3 represents a lens accommodating or retracted section connected to the WIDE extremity position of zooming section l 1, respectively. MACRO transferring section l 2 has a lead angle which is opposite to the angle of inclination of zooming section l 1, with respect to a direction which is parallel to the optical axis. Specifically, assuming that the lead angle of the zooming section l 1 is positive (+), then the lead angle of the MACRO transferring section l 2 will be negative (−).

The zoom lens as constructed operates as detailed hereinafter.

When male helicoid ring 20 is rotated in forward and reverse directions, the male helicoid ring 20 will move along the optical axis direction while rotating, in accordance with the lead angle of helicoid teeth 20a, since the female helicoid ring 18 which is engaged by the male helicoid ring 20 is secured to stationary barrel 12.

Namely, cam ring 22, which is secured to male helicoid ring 20, is rotated together with the male helicoid ring 20 and will be moved along the optical axis direction in accordance with the lead angle of the helicoid teeth 20a.

Further, lens guide ring 24, which is mounted to cam ring 22 so that the two rings will rotate with respect to each other and move together along the optical axis direction, is moved along the direction of the optical axis, without rotating, in accordance/association with axial movement of cam ring 22. Relative rotation of cam ring 22 and lens guide ring 24 causes axial movement of moving lenses 15 an 16 in accordance with the relationship between cam groove 41 and lens guide groove 43, as well as in accordance with the relationship between cam groove 42 and lens guide groove 44. Movement of the two lens groups is best illustrated in FIG. 6. As shown, rings 22 and 24 move over the substantially the same distance along the optical axis direction.

Thus, lenses 15 and 16 can be moved from the accommodation position, as shown in FIG. 1, to the macro-photographing position, which is illustrated in FIG. 4, as a result of the movement of cam ring 22 and lens guide ring 24. Thus, it should be appreciated that when in the accommodation position, the accommodation length of the lens is extremely small, since the cam ring 22 and lens guide ring 24 do not protrude outwardly from the outer shell 11a of the camera body or from the cylindrical lens cover 38.

Specifically, cam ring 22 rotates and moves along the optical axis direction in accordance with the lead angle of helicoid teeth 20a. Accordingly, the axial lengths of cam grooves 41 and 42 can be shorter than the largest axial displacement L1 of lenses 15 and 16, by an amount which corresponds to the axial displacement L2 of cam ring 22, as shown in FIG. 6. In other words, the total length of cam ring 22 can be shorter than the largest displacement L1 of the lenses by an amount which corresponds to the axial displacement L2 of cam ring 22.

On the other hand, as shown in the schematic representation of the prior art structure of FIG. 7, known cam ring 50 does not move along the optical axis direction. Consequently, in such a known cam ring 50, the axial lengths of cam grooves 51 and 52 correspond to the axial displacement of the moving lenses (i.e., to the movement of cam pins 53 and 54), and, accordingly, the axial length of cam ring 50 must be equal to or greater than the largest displacement of the lenses.

In the present structure, even if lens displacement effected by cam grooves 41 and 42 is decreased by reducing the lead angles of cam grooves 41 and 42, axial displacement effected by the lead angle of the helicoid teeth 20a will not change. Specifically, assuming that the lead angles of cam grooves 41 and 42 are zero, the displacement of lenses 15 and 16 with respect to cam ring 22 will also become zero, but lenses 15 and 16 will be finally moved by a displacement which corresponds to the lead angle of helicoid teeth 20a, insofar as cam ring 22 will axially move in accordance with the lead angle of helicoid teeth 20a as shown in FIG. 6.

Thus, even if the rear lens group cam groove 42 is provided in a plane which is perpendicular to the optical axis, lens 16 can be retracted into the accommodation position by rotating cam ring 22. This means that the lead or inclination angles of the rear lens group cam groove 42 and the lens guide groove 44 formed on cam ring 22 can be significantly reduced, so that the axial lengths of rear lens group cam groove 42 and lens guide groove 44 can be reduced in order to shorten the cam ring 22 and so as to increase the resulting accuracy of movement of moving lenses 15 and 16, as discussed hereinafter.

The relationship between the lead angles and the cam grooves 41 and 42 becomes clear when looking at accommodation section l 3 of rear lens group cam groove 42. Section l 3 of groove 42, as seen in FIG. 5, is oriented so that it is perpendicular to the optical axis of cam ring 22. If cam ring 22 could only rotate, and could not also move in the optical axis direction, as is the case with the known cam ring of FIG. 7, moving lenses 15 and 16 could not be retracted. However, in accordance with the present invention, since cam ring 22 can move along the optical axis direction, it is possible to retract moving lenses 15 and 16 even when the groove (i.e., slot) is perpendicular to the optical axis, unlike the situation with the illustrated prior art structure.

It is important to remember that the necessary displacement of lenses 15 and 16 from the TELE extremity position to the macro-photographing range is very small in a zoom lens barrel as used in accordance with the present invention. In order to decrease the displacement of lenses 15 and 16, yet still achieve necessary displacement of the lenses, excess displacement is eliminated by the disclosed configuration of cam grooves 41 and 42. Specifically, the lead angles of macro-transferring section 2 of cam grooves 41 and 42 are negative (−) to provide a negative (−) lead angle. This results in the shorter displacement L4 of rear lens group 16 (i.e., of guide pin 36) with respect to the axial displacement of cam ring 22 in the macro-transferring section l 2, than occurs in the zooming section l 1. That is, the displacement of moving lenses 15 and 16 with respect to angular displacement of cam ring 22 can be reduced, as shown in FIG. 6. With such an arrangement, since the displacement of lenses 15 and 16 relative to the angular displacement of cam ring 22 is very small, it is possible to provide a sufficient angular displacement of cam ring 22 so as to result in highly precise movement of the lenses. Further, since the lead angle of the macrotransferring section 1 2 is minus (e.g., a negative), the total length of cam ring 22 can be reduced.

In the illustrated embodiment referred to above, guide groove 27, as well as lens guide grooves 43 and 44, are all straight grooves. However, it should be appreciated that the present invention is not limited to the use of such straight grooves. Specifically, the present invention does not exclude, prevent, nor eliminate the possibility of providing guide groove 27 and lens guide grooves 43 and 44 of shapes which are other than straight, e.g., of an angled configuration. To summarize, the shapes of guide groove 27, cam grooves 41 and 42, and lens guide grooves 43 and 44 are determined so that the lens guide ring 24 will move along the optical axis direction, together with the cam ring 22, in accordance with rotation of the cam ring, and so that lenses 15 and 16 will move in the optical axis direction, along a predetermined track, in accordance with relative rotation (and axial movement) of cam ring 22 and lens guide ring 24.

It should be noted that lens guide ring 24 could be provided to rotate if desired. This could be accomplished, e.g., by forming lens guide groove 27 at a predetermined angle of inclination with respect to the optical axis, rather than parallel thereto, as is shown in FIG. 5. Even if ring 24 is rotatable, however, rings 22 and 24 can still be rotatable with respect to each other, since they can be formed so as to rotate over different angular amounts with respect to each other.

At least three guide pins 35 and at least three guide pins 36 are provided (in engageable association with cam grooves 41, 42 and lens guide grooves 43, 44) in order to prevent rear lens group frame 31 and front lens group moving frame 34 from being inclined with respect to the optical axis, which might occur due to the otherwise insufficient length of engagement with respect to lens guide ring 24. Thus, if a sufficient engagement length can be provided, or if there is the possibility that the incline of rear lens group frame 31 and front lens group moving frame 34 can be eliminated by providing additional guide poles or similar structure, the number of guide pins can be reduced to either one or two.

Although the male helicoid ring 20 and the cam ring 22 are formed of separate members which are interconnected by set screws 21, in the illustrated embodiment, they could alternatively be molded as a single integral piece of synthetic resin or similar material.

The above discussion was directed to the basic overall construction and operation of a zoom lens barrel in accordance with the present invention. The following descriptions will address additional lens mechanisms or components and combinations thereof, in accordance with other aspects of the present invention.

B. Light Intercepting Mechanism

A light intercepting plate 45 is positioned at the rear end of lens guide ring 24. This intercepting plate is adapted to intercept harmful light which would otherwise enter the lens barrel, along the inner peripheral wall of the lens barrel, from the circumferential portion of moving lens 16, and which would have an adverse influence on the formation of an image on the film plane. In the illustrated embodiment, the light intercepting plate 45 is formed by a radial extension of the linear movement guide plate 26, which extends in a direction away from the inner surface of barrel 12, and which is normal to the optical axis. The inner end of the light intercepting plate 45 is located in a position which generally corresponds to the circumferential portion of lens 16, as shown in FIG. 2. If harmful light enters the lens barrel from the circumferential portion of lens 16, through the inner wall of the lens barrel, light will be reflected by the inner wall of the lens barrel and will reach the film plane through aperture 46. This will, in turn, cause a number of undesirable problems, e.g., a reduction of image contrast or a decrease in the coloring characteristics of color film. Such a phenomenon tends to occur particularly when the lens is located in the TELE extremity position. Namely, when in the TELE extremity position, moving lenses 15 and 16 are fed forwardly (i.e., advanced) the farthest, and, accordingly, the internal space of the lens barrel is expanded. As a result, harmful light passing the circumferential portion of lens 16 is diffused within the expanded internal space of the lens barrel. Consequently, harmful light is reflected in a complicated fashion by the inner wall of the lens barrel and reaches the film plane. Light intercepting plate 45 thus effectively intercepts harmful light which would otherwise reach the film plane, as noted above, particularly when the lens is in the TELE extremity position. While shown as integrally attached to plate 26, it is alternately possible to provide a light intercepting plate 45 which is separate from guide plate 26, and/or which is attached to other camera structure.

C. Detecting Mechanism of Focal Length Information—First Embodiment

A first mechanism which is provided for detecting focal length information is adapted to detect the angular position of the cam ring 22 in order to detect zoom lens focal length information. The mechanism is attached to the periphery of one ring (or an attachment thereto) which is relatively rotatable with respect to a second ring, so that relative rotation can be detected.

Figure 8:
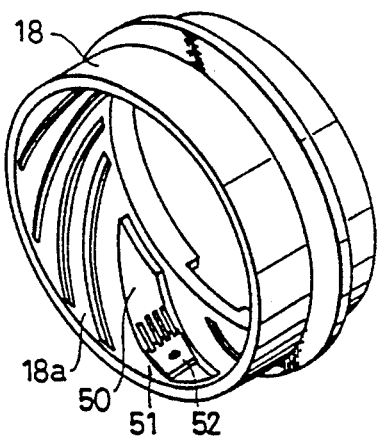
FIG. 8 is a perspective view of a brush provided on an outer helicoidal element in order to detect the angular position of a cam ring.

As shown in FIGS. 1-5, a code plate 48 is attached to cam ring 22 indirectly, i.e., it is attached to the outer periphery of male helicoid 20 which is attached to the cam ring. Plate 48 is secured to helicoidal ring 20 by set screws 49 and is inclined at an angle which is identical to the angle of inclination (with respect to the optical axis) of helicoid teeth or threads 20a. Outer helicoid 18 is provided, along its inner periphery, with a brush securing recess 50 (see FIG. 8) which corresponds to code plate 48. Recess 50 can be inclined, as shown, at the same angle as the angle of inclination of each of the helicoid grooves 18a (it is not so inclined, e.g., in the embodiments of FIGS. 10, 10A, and 11) Brush 51, having a base portion 52, is secured to recess 50 so that it will always come into sliding contact with code plate 48. Brush 51 is positioned so that it is substantially parallel to the length of code plate 48. Code plate 48 and brush 51 together comprise a detecting mechanism for detecting the angular position of cam ring 22, i.e., for detecting information relating to the focal length of the zoom lens, the accommodated position of the lenses, and the WIDE and TELE extremity positions of the zoom lens. Code plate 48 includes conductive lands 48a and nonconductive lands 48b, as best illustrated in FIG.

9. Brush 51 includes one common terminal 51a and three terminals 51b, so that when terminals 51a and 51b come into contact with the conductive lands 48a of code plate 48, a signal "0" will be output, and, when the terminals do not come into contact with conductive lands 48a, a signal "1" will be output. The relative angular position of cam ring 22 and lens guide ring 24 can be detected by a combination of signals "1" and "0". Base portion 52 of brush 51 is connected to control board 54 through flexible printed circuit (FPC) board 53.

Code plate 48, which comprises part of the angular position detecting mechanism, can be inclined with respect to rings 20 and 22, at an angle which is identical to the angle of inclination of helicoid teeth 20a, so that the code plate 48 will move in the same direction as the helicoid teeth, as noted above, and, accordingly, so that the code plate 48 will not be a bar or obstacle to reduction of the combined length of the lenses.

Figure 10:
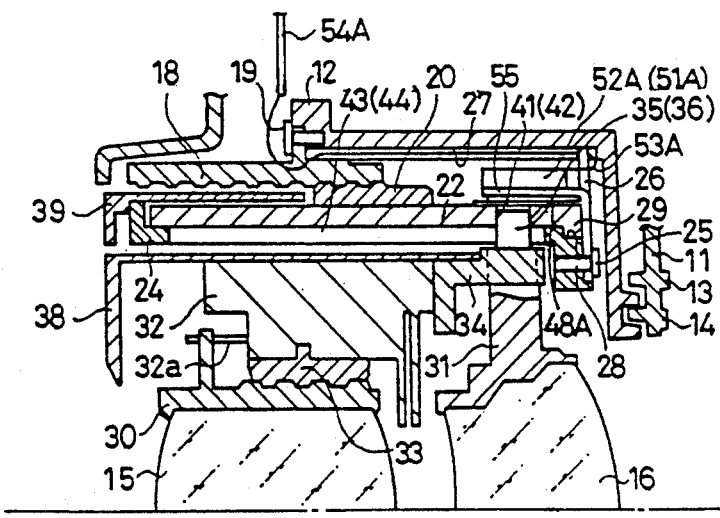
FIG. 10 is a longitudinal sectional view of a zoom lens barrel illustrating a mechanism for detecting the angular position of a cam ring, similar to the view shown in FIG. 1, according to a second embodiment of the present invention.
Figure 11:
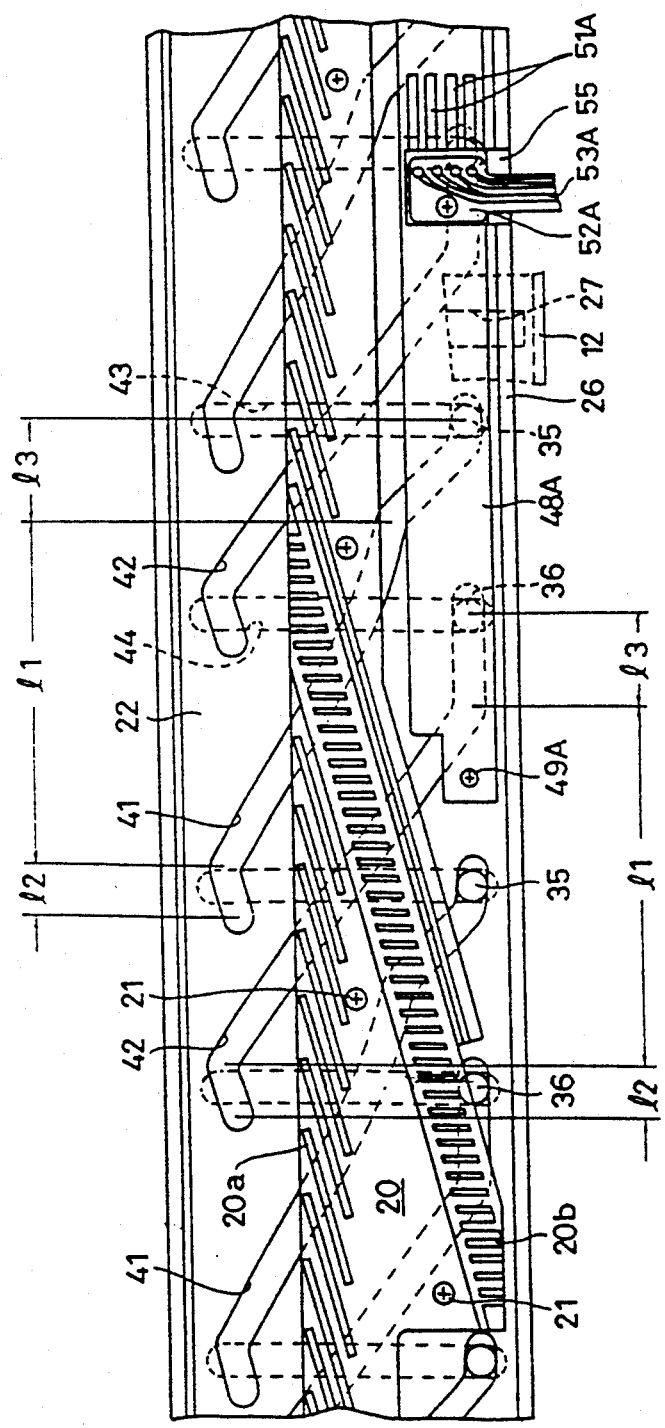
FIG. 11 is a developed or plan view of the angular position detecting mechanism illustrated in FIG. 10, a cam ring, a lens guide ring, and an inner helicoid ring.

D. Detecting Mechanism of Focal Length Information—Second and Third Embodiments FIGS. 10 and 11 illustrate a second embodiment of a focal length information detecting mechanism; in this embodiment, the mechanism is also attached to a ring which is relatively rotatable with respect to a second ring. The first focal length information detecting mechanism (1) referred to above is positioned between helicoidal ring 18 and cam ring 22, and is directly attached to the outer periphery of ring 20. Alternatively, the second focal length information detecting mechanism (2), as described in this section, is provided between lens guide ring 24 and a bent portion of plate 26, which is attached to a rear surface of cam ring 22. In this embodiment code plate 48A is not inclined with respect to the optical axis, but is directly positioned on the outer periphery of cam ring 22 so that it is concentric with ring 22 about the optical axis.

Figure 9:
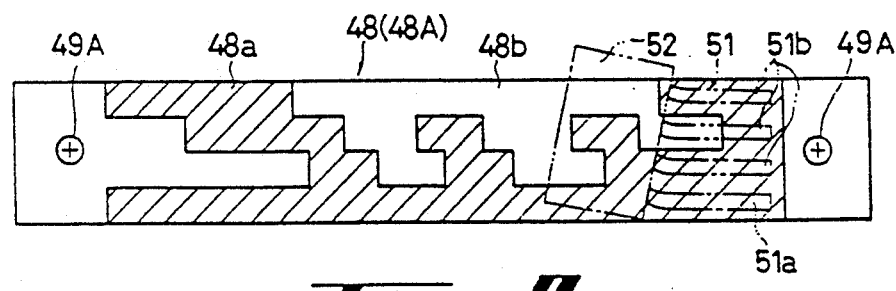
FIG. 9 is a plan view of a code plate which is placed into sliding contact with the brush on the helicoid illustrated, in FIG. 8.

Code plate 48A is secured to the outer periphery of the rear end of cam ring 22 by set screws 49A (see FIG. 11). Brush 51A, which includes a base portion 52A connected to a brush securing member 55 positioned above the code plate 48A, is in continuous sliding contact with code plate 48A. Brush securing member 55 is formed by bending a portion of the guide plate 26, which is secured to the rear end of lens guide ring 24, so that the securing member is parallel with the optical axis. Code plate 48A and brush 51A together comprise a detecting mechanism for detecting the angular position of cam ring 22, i.e., for detecting zoom lens focal length information, the accommodated position of the lens, and the WIDE and TELE extremity positions of the zoom lens. The construction of both code plate 48A and brush 51A are essentially the same as those of the above-noted focal length detecting mechanism (1), as illustrated in FIG. 9. Base portion 52A of brush 51A is connected to control board 54A through a flexible printed circuit board 53A. As can readily be understood from the above discussion, the focal length information detecting mechanism is thus functionally (although not physically) positioned between cam ring 22 and lens guide ring 24. If desired, the mechanism could be directly positioned between rings 22 and 24, if adequate clearance is provided.

Figure 10A:
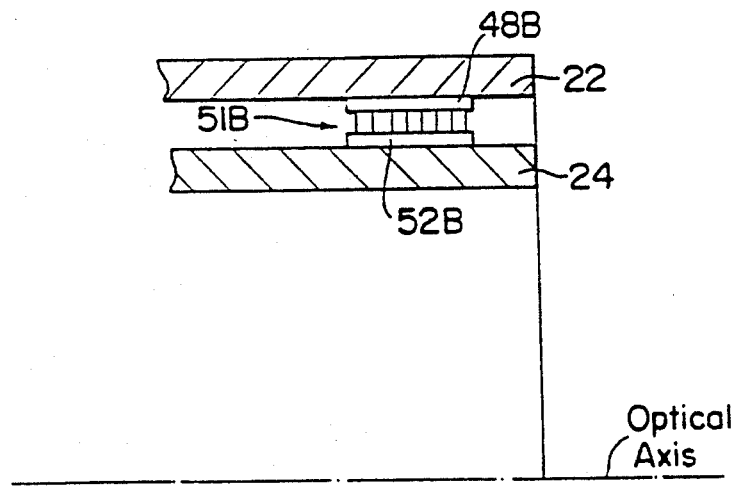
FIG. 10A is a longitudinal sectional view of a zoom lens barrel illustrating an alternate (third) embodiment of the mechanism of FIG. 1.

The third embodiment of the angular position detecting mechanism (i.e., focal length detector) is illustrated in FIG. 10A. In this Figure, the mechanism is physically positioned between relatively rotatable rings 22 and 24. As shown, code plate 48B is positioned on the inner peripheral surface of cam ring 22, with conductive brush 51B (having a base 52B and suitable bristles) positioned on the exterior surface of ring 24 (although the plate and brush could alternatively be oppositely disposed). Thus, relative rotation of the rings, as in the above embodiments, effects continuous sliding contact of brush 51B and plate 48B, and together define a detecting mechanism for detecting the angular position of cam ring 22.

E. Operation Mechanism for the Close Distance Correcting Optical Element

Figure 12:
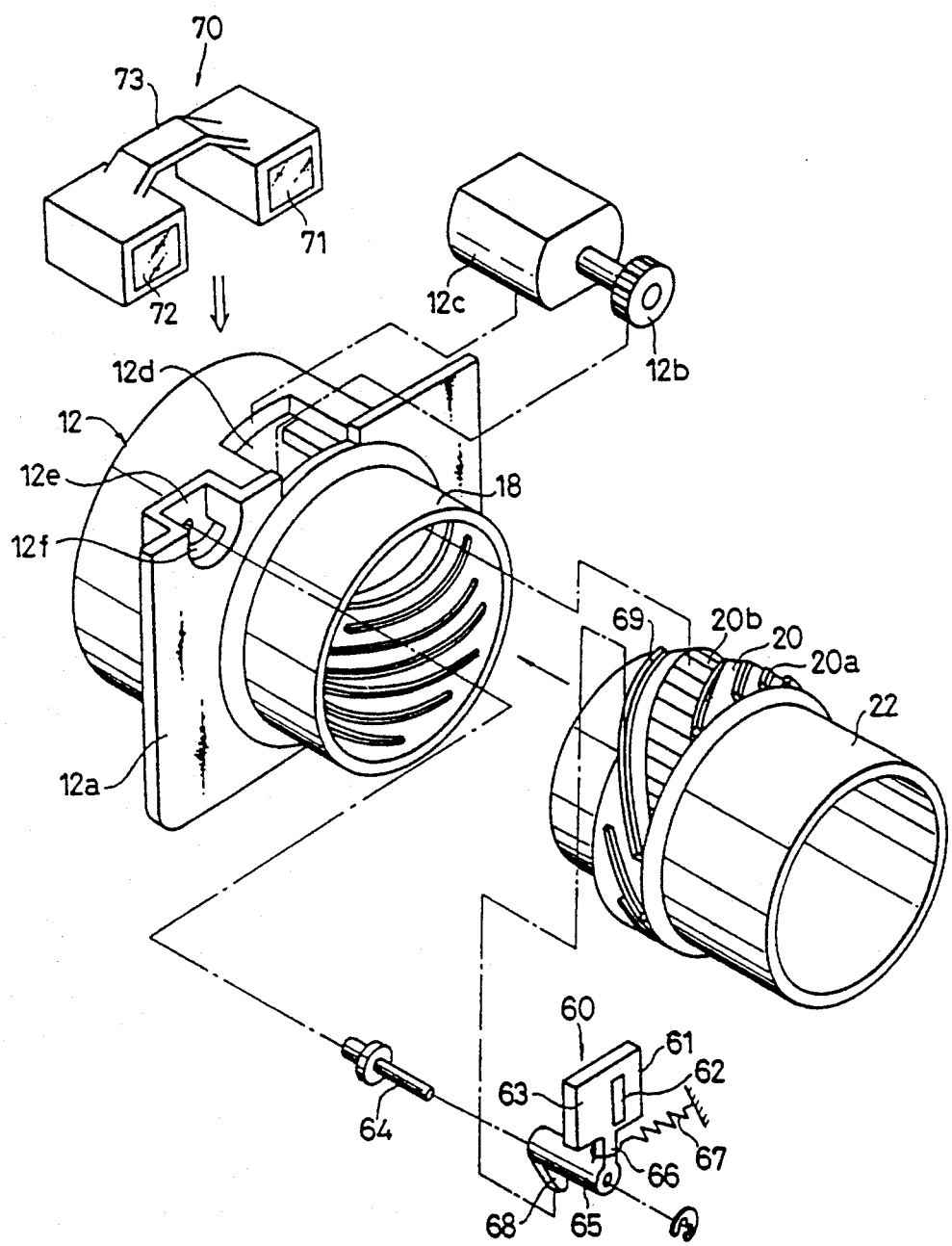
FIG. 12 is an exploded perspective view of the zoom lens barrel which is shown in FIGS. 1-4, and of a close distance (i.e., macro) correcting mechanism for an object distance measuring device.
Figure 13:
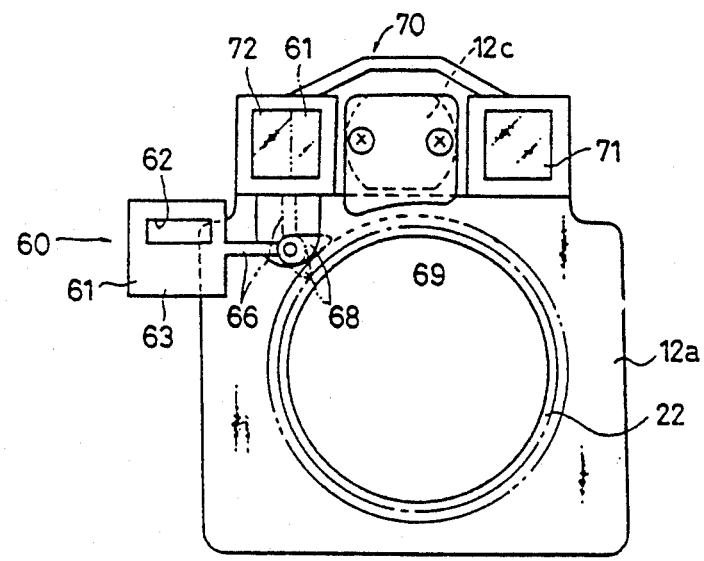
FIG. 13 is a front elevational view of the apparatus illustrated in FIG. 12.

As illustrated in FIGS. 12-14, the stationary barrel 12 has, at its front end, a lens barrel support plate 12a which lies in a plane which is normal to the optical axis. A zoom motor 12c, having a pinion 12b at one axial end, is secured to the upper portion of supporting plate 12a via a securing member which is not illustrated. Pinion 12b is exposed within stationary barrel 12, i.e., it extends outwardly of the barrel, via a gear window 12d formed in barrel 12. Lens barrel support plate 12a is provided, along an upper portion of the plate in the vicinity of gear window 12d, with a supporting recess 12e within which a close distance correcting optical device 60 is also supported.

An object distance measuring device 70 is secured to stationary barrel 12. This object distance measuring device detects the object distance in accordance with a photo-induced current, which depends upon the object distance. The device includes a light emitting portion 71 and a light receiving portion 72, which is connected to the light emitting portion 71 by a connecting portion or bridge 73. The light emitting portion 71 and light receiving portion 72 (which includes, e.g., a PSD [i.e., position sensing device] as a light receiving element) are located on opposite sides of the zoom motor 12c. Object distance measuring device 70, which is known per se, detects the object distance based on the known triangulation measuring principle.

Light emitting portion 71 includes, e.g., a light source such as an LED, and a projecting lens, and light receiving portion 72 includes, e.g., a PSD which is spaced from the light source by a predetermined base length, and a light receiving lens, as noted above. It should be noted that the light source, the projecting lens, and the light receiving lens (all of which are not shown) are preferably provided in a single unit or assembly. Light emitted from the light source is reflected by the object and is incident upon the PSD the light receiving portion 72, on which the incident position (i.e., the light point) of light on the light receiving surface depends upon the object distance. The object distance can be detected by the photo-induced current, which depends upon the light point. An operation signal, which is sent in response to the detected object distance data, is supplied to shutter block 32 in order to effect automatic focusing. The close distance correcting optical device 60 is supported within supporting recess 12e of lens barrel support plate 12a so that it will move away from and approach the light receiving portion 72 of object distance measuring device 70. The close distance correcting optical device 60 moves correcting optical element 61 (e.g., a prism) to bring it in front of light receiving portion 72 only in the macro-photographing mode, so that light reflected from the object is refracted in order to change the incident position of reflected light onto the light receiving portion 72 in the macro mode, thereby improving object distance measurement accuracy in the macro mode. The correcting optical element 61 is not limited to the illustrated embodiment, which is described in detail, e.g., in Japanese Patent Application No. 62-42,198 (corresponding to U.S. application Ser. No. 159,765), filed in the name of the assignee of the present invention, since the subject of the present invention is not directly directed to the details of construction of the correcting optical element 61.

The correcting optical element 61 includes an opening 62 on the object side and an opening (not illustrated) on the side of the light receiving portion 72. The correcting optical element 61 also includes a mask 63 which intercepts light outside of the necessary light path. Opening 62, which is offset from the optical axis of light receiving portion 72, is provided in the form of a slit. The correcting optical element 61 has an arm 66, which is connected to a rotatable shaft 65, which is in turn pivoted about a pivot shaft 64 secured within supporting recess 12e. The correcting optical element 61 is rotatably biased by a tensile spring 67, so that element 61 will tend to move in front of the light receiving portion 72. Tensile spring 67 is connected at one end to arm 66 and at an opposed, second end, to outer helicoid 18 or to an element on the outer helicoid side. Rotatable shaft 65 is provided on its rear lower end portion with an associated projection 68, integral therewith, which includes a front end projecting into the stationary barrel 12 through window 12f of supporting recess 12e. Associated projection 68 is briefly illustrated, in FIGS. 1 and 2, by an imaginary line.

Projection 68 is disengagably engaged by one helicoid tooth or thread 69 of inner helicoid 20 in order to move correcting optical element 61. Helicoid tooth 69 is formed by an extension of one of the helicoid teeth 20a along gear 20b. The length of helicoid tooth 69 substantially corresponds to the section of angular displacement of cam ring 22 in which the zoom lens is located between the TELE extremity and the WIDE extremity positions, so that the helicoid tooth 69 will have a cutaway portion 69a (see FIG. 14A) which is not engaged by the associated projection 68 in the macro mode of the camera.

Figure 14A:
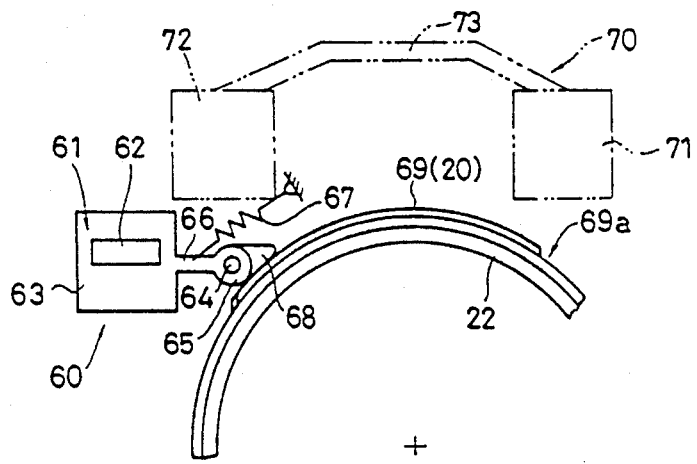
FIGS. 14A and 14B are a front elevational view of the close distance correcting optical element shown in FIG. 12, in inoperative and in operative positions, respectively.
Figure 14B:
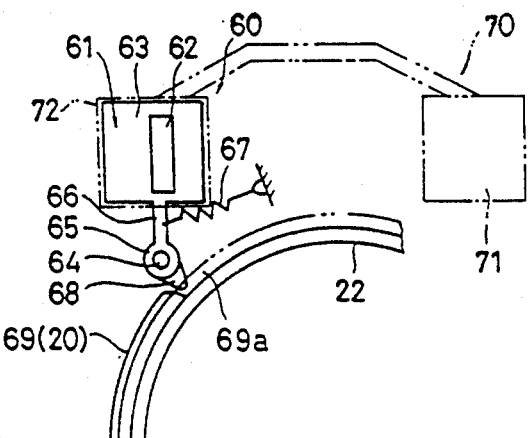

Specifically, the correcting optical element 61 is located in an inoperative or retracted position in which the associated projection 68 is engaged by the helicoid tooth 69, so that the correcting optical element 61 is retracted from the optical axis of light receiving portion 72 in the normal photographing position of the zoom lens, i.e., between the TELE extremity and the WIDE extremity, as is well illustrated in FIG. 14A. On the other hand, in the macro position of the zoom lens, the associated projection 68 is positioned in the cutaway portion 69a, so that the associated projection 68 will be disengaged from helicoid tooth 69, and such that the correcting optical element 61 will be brought in front of the light receiving portion 72 as shown in FIG. 14B.

With such an arrangement for a close distance correcting mechanism, movement of correcting optical element 61 towards the front end of the light receiving portion of the object distance measuring device can be ensured by the noted configuration of the helicoid tooth 69 which is provided on cam ring 22. Accordingly, no special element needs to be additionally provided, thereby providing a relatively simple operating mechanism for selectively positioning the optical element 61 in front of the light receiving element 72 during macro photography.

F. Guide Mechanism for the Flexible Printed Circuit Board

The following discussion is directed to a guide mechanism for the flexible printed circuit board 81, which supplies an operating signal to shutter block 32.

As illustrated in FIG. 3, the flexible printed circuit board 81 is connected to control circuit board 54, and is positioned or introduced within a space defined by stationary barrel 12 and cam ring 22 through a window formed in stationary barrel 12. The flexible PC board 81 is then extended rearwardly within the space located substantially along the inner surface of stationary barrel 12, so that it between projections 26a of the linear movement guide plate 26. The flexible PC board 81 is then bent forwardly, at a first bent portion 81a, and extends along the outer surface of guide plate 26 and along the inner circumference thereof, in a generally forward direction.

Figure 15:
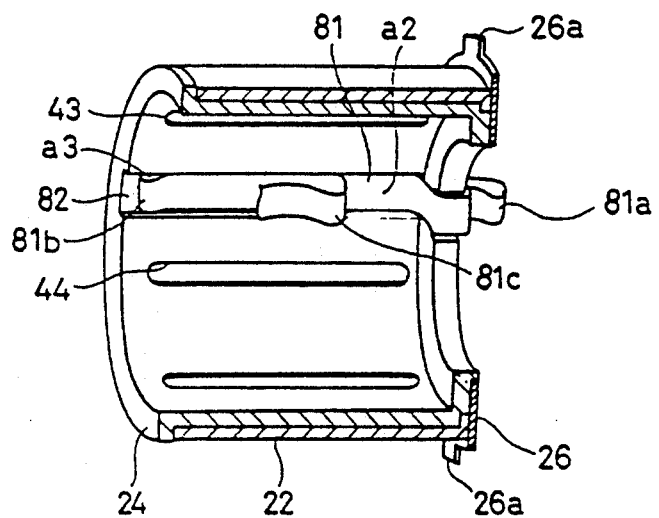
FIG. 15 is a partially cut away or broken prospective view of a mechanism for housing a flexible printed circuit board connected to the shutter unit of a zoom lens barrel, as shown in FIGS. 1-4.

Lens guide ring 24 is provided, along its inner periphery, with a substantially linear (flexible PC board) guide groove 82 having a bottom or base extending along (i.e., parallel to) the optical axis direction, as shown in FIG. 15. The flexible PC board 81, which extends along the inner side face of guide plate 26, extends forwardly through guide groove 82. Board 81 is bent backwardly or rearwardly at a second bent portion 81b, in the vicinity of the front end of guide groove 82 of lens guide ring 24, so that it will be superimposed onto the remaining portion of flexible PC board 81. The flexible PC board 81 extends beyond the rear ends of shutter unit 32, the lens guide cylinder 38, and the front lens groove frame 30, and is then bent forwardly at a third bent portion 81c so that it will be connected to shutter block 32.

The flexible PC board 81 includes contact sections a1, a2, and a3. Portion a1 comes into contact with the rear side face of guide plate 26 and portion a2 comes into contact with the bottom of guide groove 82. Portion a3 is located in the vicinity of the second bent portion 81b. Flexible board 81 is connected along at least the above-mentioned portions a1, a2, and a3, to respective contacting members by a suitable adhesive or mechanical connector. Of course, the board can be connected to any adjacent camera components, as long as the board retains its flexibility, yet remains secured to the camera; similarly, a greater or lesser number of sections can be so adhered.

Flexible board 81 is deformable, in accordance with zooming operation of the zoom lens, as detailed hereinafter.

When the zoom lens is moved from its accommodation position, as shown in FIG. 1, to the WIDE extremity position shown in FIG. 2, and thereafter to the TELE extremity position as shown in FIG. 3, by the zooming motor, cam ring 22 moves along the optical axis direction while rotating, so that lens guide ring 24 will move, without rotating, together with cam ring 22. As a result, the space behind guide plate 26 is expanded, and the loop formed by the bent or deformed portion 81a of board 81 becomes relatively large. However, the extent of the expansion of the loop of bent portion 81a is relatively small, since the expansion of the loop occurs while the flexible board 81 moves in the direction of movement of lens guide ring 24.

Further, because moving lens 15 and, accordingly, shutter black unit 32, are moved forward relative to lens guide ring 24 by the relative rotation of cam ring 22 and lens guide ring 24, which occurs at the same time as axial movement of cam ring 22, lens guide ring 24 and shutter block unit 32, the space between the front lens group frame 30 and the guide plate 26 is expanded during such forward movement of the cam ring. Simultaneously, the loop diameter of flexible PC board 81 expands while the third bent portion 81c moves forwardly, with the extent of expansion being small. Accordingly, movement and deformation of bent portions 81a and 81c caused by axial movement of shutter unit 32 causes the flexible PC board 81 to extend without having an adverse influence on the operation of other components and the optical system,. i.e., the relatively small loop expansion does not interfere with the operation of other camera elements. Since the second bent portion 81b is bonded, at its periphery, to guide groove 82, no relative displacement of the second bent portion 81b with respect to the lens guide ring 24 will occur.

Even when in the MACRO or TELE extremity positions, in which the loop of bent portions 81a and 81c is the largest, because the upper portions of these bent portions are adhered to plate 26 (or, alternatively, to stationary barrel 12) and to flexible PC board guide groove 82, respectively, neither inclination of the bent portions 81a and 81b with respect to the optical axis, nor the entrance of bent portions 81a and 81b into the light path, will occur, thereby resulting in a lack of interference with other camera components.

To the contrary, when the zoom lens is returned from the TELE extremity to the WIDE extremity or the accommodation position, the space between shutter unit 32 and guide plate 26, and the space behind guide plate 26, are both reduced. Simultaneously, the length of the portions of the flexible board 81 that are superimposed on each other increases, so that the bent portions 81a and 81c are moved rearwardly to decrease their loop diameters. Specifically, the length of superimposition of the flexible PC board 81 increases and the loop diameter of the bent portions 81a and 81c decreases in accordance with rearward movement of shutter block unit 32. Accordingly, there is no possibility that the flexible PC board will interfere with other moving members, or will enter into the light path.

A flexible PC board guide groove 82 is formed in the lens guide ring 24 in the illustrated embodiment, as noted above; if, however, there is a sufficient gap between the lens guide ring 24 and the cylindrical lens cover 38 through which the flexible PC board 81 can pass, guide groove 82 could be eliminated if desired.

G. Mechanism for Guiding Movement of Lens Guide Ring 24

Figure 17:
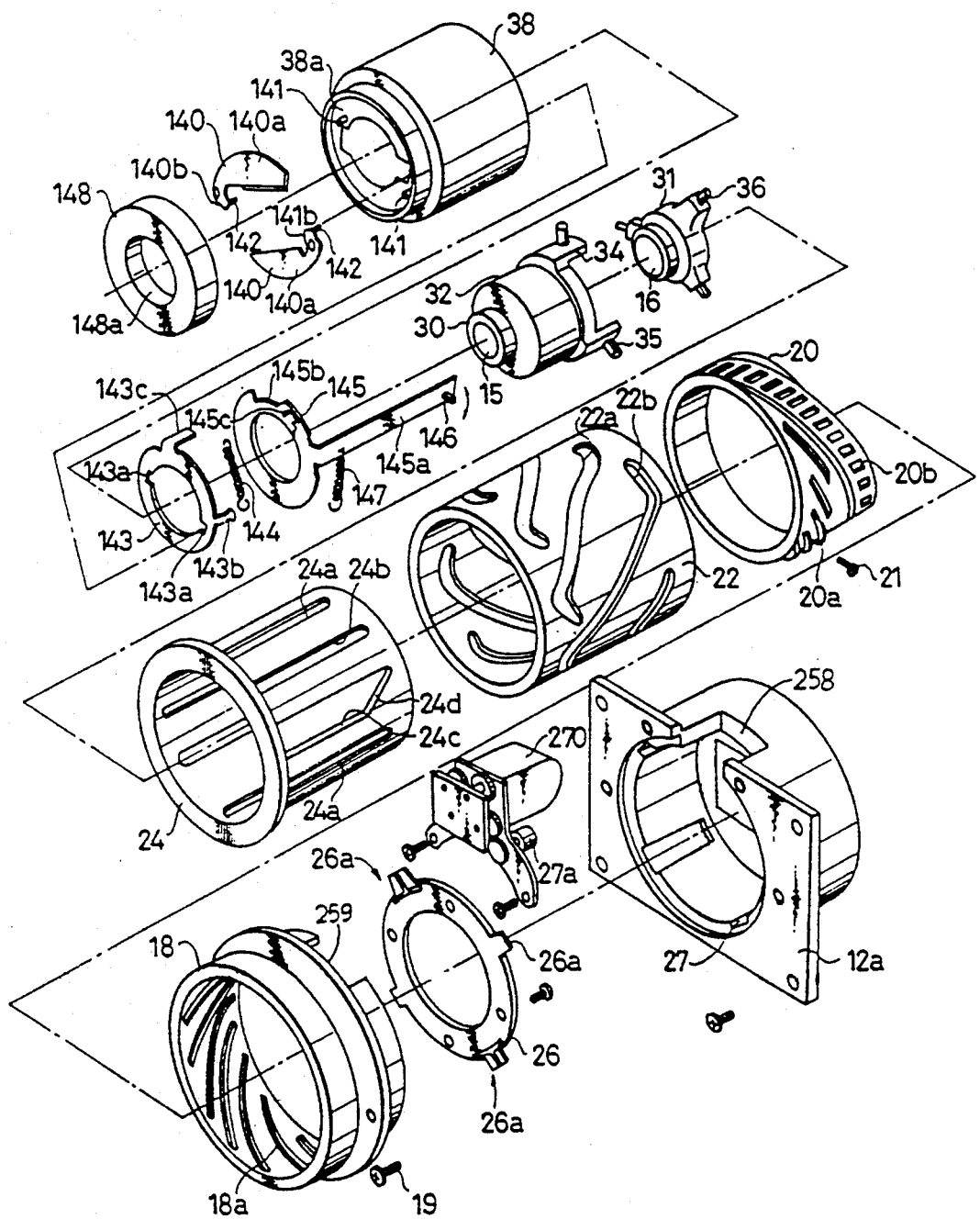
FIG. 17 is an exploded perspective view of the zoom lens barrel illustrated in FIGS. 1-4, in combination with a light barrier mechanism.

Guide plate 26 is secured to the rear end of lens ring 24 by set screws 25, as mentioned above. Guide plate 26 includes guide projections 26a, as shown in FIG. 17, which are fitted within guide grooves 27 formed on the inner surface of stationary barrel 12, in order to restrict the direction of movement of lens guide ring 24. Accordingly, it is necessary to make the positions and dimensions of the guide projections 26a and guide grooves 27 exactly identical to each other in order to precisely restrict the direction of movement of the lens guide ring 24. This, however, is practically difficult to achieve. The solution, as illustrated in FIG. 16, e.g., is to utilize guide projections 26 which are elastically deformable. In this way, possible deviations in the shape and positions of the guide grooves 27 and guide projections 26a can be absorbed, or compensated for, by elastic deformation of guide projections 26a.

Guide plate 26A, as shown in FIG. 16, comprises a substantially circular disk-shaped plate and has an outer periphery with a plurality of the linear movement guide projections 26a extending outwardly from the periphery of the plate. These projections are fitted into corresponding straight guide grooves 27 formed on the inner surface of stationary barrel 12. The guide grooves 27 for the lens guide ring extend along (i.e., are parallel to) the optical axis direction. In the illustrated embodiment, four guide projections 26a are spaced from one another at equiangular positions which are 90 degrees apart from each other. It should be noted that the number of guide projections 26a (and guide grooves 27) is not limited to four, and therefore can either be less than or more than four. Two (theoretically, at least one) guide projections 26a are divided by radial slits 26b into two halves which are adapted to be located on opposite sides of the optical axis and which together form a pair of elastically deformable guide pieces 26c which are adapted to be elastically deformed so that they will approach each other. Guide pieces 26c absorb or compensate for possible positional or dimensional deviations between guide projections 26a and guide grooves 27. In other words, the use of such flexible split members minimizes problems which would otherwise result from an improper fit between grooves 27 and projections 26. Specifically, guide projections 26a are fitted into associated guide grooves 27 such that, when fitted, guide pieces 26c are slightly elastically deformed so as to approach each other and reduce the width of radial slits 26b. These radial slits are connected to circumferential slits 26e which are formed in plate portion 26d of guide plate 26A, as seen in FIG. 1 6. Circumferential slits 26e are located about the same (imaginary) circle, and contribute to relatively easy elastic deformation of the elastically deformable guide pieces 26c.

As should be understood from the above, because guide projections 26a of guide plate 26A, which are fitted into corresponding guide grooves 27 of stationary barrel 12, are elastically deformable along the widthwise direction of guide grooves 27, any possible positional deviation which may occur between guide projections 26a and guide grooves 27 can be effectively compensated for, i e., absorbed. Further, the use of such flexible guide pieces 26c makes it easier to insert guide projections 26a into associated guide grooves 27.

H. Barrier Opening and Closing Mechanism

FIGS. 17-19 illustrate a barrier mechanism which can be advantageously incorporated into the zoom lens barrel referred to above, e.g.

The barrier mechanism is notable in that its barriers are closed and opened by relative axial displacement of a cylindrical lens cover, including the barriers, and the lens guide ring 24.

A pair of lens barriers 140 are provided on the front end of cylindrical lens cover 38. Lens barriers 140 are opened and closed in the lens accommodation section 1 3 in such a way that they will be closed in the accommodation position of the lens and such that they will be maintained in an open position whenever the lens is located between the accommodation position and the macro position. Although two barriers 140 are shown, one (or more than two) could also be used.

Barriers 140 are pivoted to a surface of a flange portion 38a provided on the inner periphery of the front end of lens cover barrel 38, via respective pivot pins 141. Barriers 140, which are symmetrically opposed to each other, have barrier plate portions 140a which can be moved into the light path, and driving arm portions 140b which extend in opposite directions from barrier plate portions 140a, with respect to pins 141. Driving arm portions 140b are provided at their ends with pins 142 which extend rearwardly, along the optical axis direction, through the inner space, i.e., opening, in flange portion 38a.

A circular disk-like intermediate ring 143 and a circular disk-like driving ring 145 for operating barriers 140 are rotatably mounted on the back of flange portion 38a. Intermediate ring 143 is provided along its inner periphery with grooves or notches 143a, within which pins 142 are engaged; and, along its outer periphery, with a projection 143b and intermediate engaging piece 143c, both of which extend rearwardly along the optical axis direction. A closing spring 144, which continuously biases lens barriers 140 to close the barriers, is provided between projection 143b and pin 145c, which itself is provided on driving ring 145.

Driving ring 145 has an outer periphery with a driving arm 145a attached thereto which extends rearwardly along the optical axis direction. Driving arm 145a extends through the gap which exists between cam ring 22 and lens guide ring 24, and includes a pin 146 provided on the front end of driving arm 145a. Pin 146 is fitted into barrier opening and closing cam groove 24c which is formed in lens guide ring 24. Recess 145b is formed on the outer periphery of driving ring 145 so that the intermediate engaging piece 143c of intermediate ring 143 will be fitted into recess 145b.

Driving ring 145 is continuously biased by an opening spring 147 which is provided between driving arm 145a and cylindrical lens cover 38 in order to open barriers 140. As a result, pin 146 of driving ring 145 is brought into abutment with barrier opening and closing cam groove 24c by the rotational spring force of opening spring 147. Intermediate engaging piece 143c of intermediate ring 143 is brought into contact with the inner wall of recess 145b of driving ring 145 under the rotational biasing force of closing spring 144; in this fashion, intermediate ring 143 rotates together with driving ring 145.

A barrier cover 148, which covers lens barriers 140 and which includes a photographing opening 148a, is attached to the front end of lens cover barrel 38.

Figure 18A:
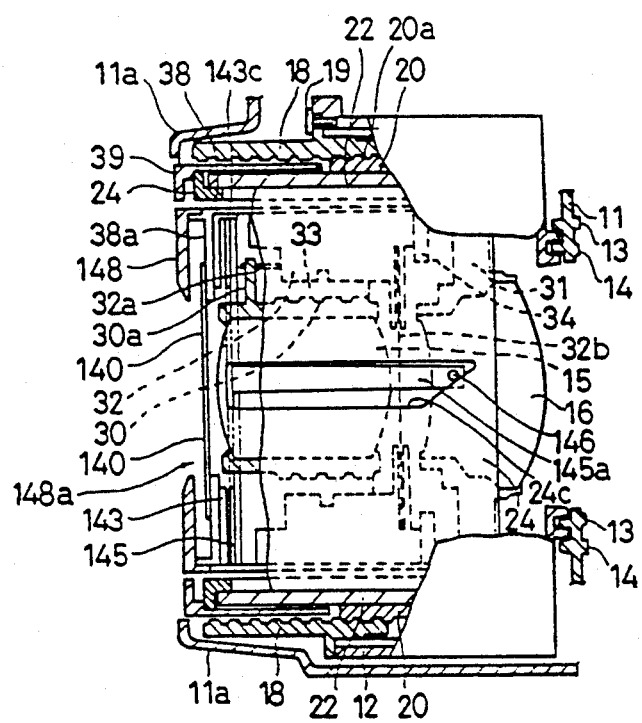
FIGS. 18A and 18B are longitudinal sectional views of a zoom lens barrel having a barrier mechanism as shown in FIG. 17, and is shown in a closed position in which the barriers are closed and an open position in which the barriers are open, respectively.
Figure 18B:
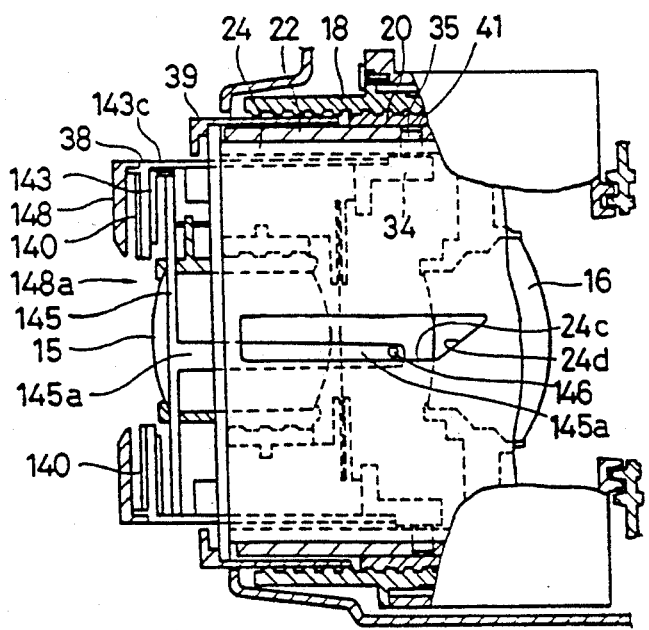

In a barrier mechanism constructed as detailed above, pin 146 rides on an inclined portion (i.e., a barrier opening and closing drive portion) 24d of the barrier opening and closing cam groove 24c, when the zoom lens is positioned in the accommodation position illustrated in FIG. 18A. In this fashion, driving ring 145 is rotated against the force of opening spring 147 so as to close barriers 140. Consequently, intermediate ring 143 rotates in the closing direction, together with driving ring 145, so as to rotate barriers 140 so that barrier plate portions 140a will close the light path (see FIGS. 18A and 19A).

When motor 270 rotates, cam ring 22 also rotates and moves along the optical axis direction, as noted above, so that the front lens group moving frame 34 will move forward (with lens cover 38) relative to lens guide ring 24. Since lens cover 38, the driven or intermediate ring 143, and driving ring 145 move forward together with front lens group moving frame 34, pin 146 will move towards the portion of the barrier opening and closing cam groove 24c that extends, parallel to the optical axis, from the inclined portion 24d of the groove 24c. As a result, driving ring 145 is rotated in the barrier opening direction under the rotational biasing force of opening spring 147 so as to rotate the intermediate ring 143 in the same direction, thereby rotating barriers 140 so as to open them (see FIGS. 18B and 19B). Thereafter, even if cam ring 22 is rotated from the zooming range into the macro position, pin 146 will come into slidable contact with the portion of the barrier opening and closing cam groove 24c that extends parallel to the optical axis and will thus maintain its rotational or angular position; accordingly, barriers 140 will thus be maintained in their open position.

In the embodiment which is illustrated, intermediate ring 143 is positioned between barriers 140 and driving ring 145, and closing spring 144 is positioned between intermediate ring 143 and driving ring 145 to bias the driven intermediate ring 143 towards the barrier closing direction with respect to the driving ring, so that some play (i.e., space) will be provided between the intermediate engaging piece 143c, which functionally connects intermediate ring 143 and driving ring 145, and recess 145b.

Thus, when driving ring 145 is rotated in the closing direction, intermediate ring 143 is rotated in the same direction, maintaining abutment of the intermediate engaging piece 143c with one of the inner walls of recess 145b, all under the biasing spring force of closing spring 144. In this fashion, barriers 140 can be rotated into the closed position. When opposed edges of the barrier plate portions 140a of barriers 140 come into contact with each other to stop rotation of barriers 140, intermediate ring 143 will stop rotating.

However, driving ring 145 continues rotating further in the closing direction, thus tensing opening spring 144, since the aforementioned play does exist between recess 145b and intermediate engaging piece 143c (due to their relative sizes). The further or excess rotation of driving ring 145, as referred to above, absorbs (i.e., compensates for) possible dimensional or tolerance type errors which arise during manufacturing and assembly of components, in order to completely close barriers 140.

It should be appreciated that, as an alternative structure, it will be possible to provide spring members which bias the respective barriers 140 to open the barriers in order to provide play between the pin and the recess which functionally connect barriers 140 and driving ring 145, instead of using intermediate ring 143.

I. Driving Mechanism for Cam Ring 22

Figure 23:
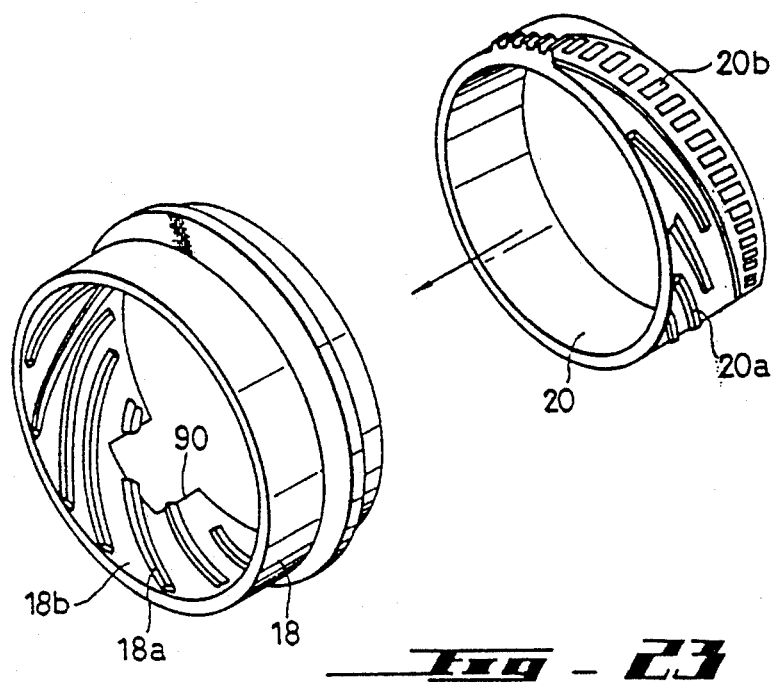
FIG. 23 is an exploded perspective view of the main elements which, are illustrated in FIG. 22.

Male helicoid ring 20 is provided with an outer periphery having a gear 20b with teeth which extend in a direction which is parallel to the optical axis, as illustrated in FIGS. 21 and 23. The teeth of gear 20b are formed by grooves defined between adjacent male helicoid teeth or threads 20a, which are spaced at a predetermined distance from each other, as shown in the illustrated embodiment, and are thus positioned along the threads.

Gear 20b preferably extends over a greater distance, as viewed in the direction of the optical axis, than do any of male helicoid teeth or threads 20a. At least one of threads 20a, however, can be made longer than others (see, e.g., thread 69 of FIG. 12), is located adjacent to gear 20b, and is used to selectively position optical element 61. This thread has been previously discussed.

Motor 254 drives pinion or driving gear 255, which meshes with gear 20b. Motor 254 is attached to a securing plate 256, which is provided with a reduction gear train 257 which transmits rotational force of the output shaft of motor 254 to pinion 255. Securing plate 256 is secured to stationary barrel 12. Barrel 12 and female helicoid ring 18 have respective cutaway portions 258 and 259 for receivably engaging pinion 255 and gear 20b, so that the gear 20b can be engaged by pinion 255 through the cutaway portions.

Since gear 20b is formed among male helicoid teeth 20a, as noted above, even if the male helicoid ring 20 moves in the optical axis direction while ring 20 is rotated, in accordance with the lead angle of male helicoid teeth 20a, gear 20b will move along the same angled direction as the adjacent teeth, so that engagement of gear 20b with pinion 255 can be continuously maintained. In other words, the relative positions of gear 20b and pinion 255 are constant, even when ring 20 is rotated. Accordingly, when pinion 255 rotates, gear 20b (i.e. male helicoid ring 20) will rotate and move along the optical axis direction in accordance with the lead angle of male helicoid teeth 20a. Specifically, male helicoid ring 20 is not only rotated in forward and reverse directions by pinion 255, which engages gear 20b, and motor 254 which drives the pinion and gear, but is also moved in the optical axis direction during rotation thereof in accordance with the lead angle of male helicoid teeth 20a. Thus, cam ring 22 is also moved along the optical axis direction while rotating together with the male helicoid ring 20. It should be noted that because gear 20b is formed along the male helicoid teeth 20a, gear 20b is always moved so that it will engaged by pinion 255 in accordance with movement of cam ring 22.

As should be noted from the above discussion, because gear 20b is spirally formed along male helicoid teeth 20a, it is not necessary that pinion 255 have teeth which are long enough to cover axial displacement of cam ring 22. As a result, there is no need to provide a large space for accommodating the pinion. Further, because it is necessary to provide the band-like gear 20b only with a width which can be engaged by pinion 255, gear 20b can be formed so that it will be partially superimposed on male helicoid teeth 20a. This makes it possible to provide a code plate, for detecting focal length, on a portion of cam ring 22 that is not covered by gear 20b.

In the illustrated embodiment, when motor 254 is driven, male helicoid ring 20 and cam ring 22 are not only rotated through pinion 255 and gear 20b, but are also moved along the optical axis direction in accordance with the lead male helicoid teeth 20a. Accordingly, the tooth surfaces of pinion 255 and gear 20b also come into sliding contact with each other along the optical axis direction. In order to ensure smooth contact and separation of the gear and pinion tooth surfaces, front and rear end edges of pinion 255 can be formed as rounded, as illustrated in FIG. 20.

Although the tooth traces of gear 20b and pinion 255 extend along the optical axis direction in the illustrated embodiment, it is also (alternatively) possible to provide gear 20b and pinion 255 which have tooth traces which extend in other directions, e.g., in a direction which is perpendicular to the lead angle of male helicoid tooth 20a.

J. Helicoid Engaging Mechanism

Female helicoid ring 18 has a partially cutaway portion 90 in which a drive mechanism for rotating cam ring 22 is arranged within the zoom lens barrel, as discussed above. Thus, when the end face of male helicoid ring 20 enters the cutaway portion 90 during rotation of cam ring 22, part of the male helicoid ring 20 will become disengaged from one end face 90a of the cutaway portion 90. Since there is a clearance "c" (which is shown in an exaggerated fashion in FIG. 25) which exists between the female helicoid ring 18 and male helicoid ring 20 (both of which are comprised, e.g., of resinous material), there is a possibility that male helicoid 20b will interfere with the end face 18a of female helicoid 18, which is positioned into the cutaway portion 90 whenever cam ring 22 is reversed, so as to engage the two helicoids. In the worst case situation, rotation of the helicoids may be stopped by the engagement/interference referred to above.

Figure 24:
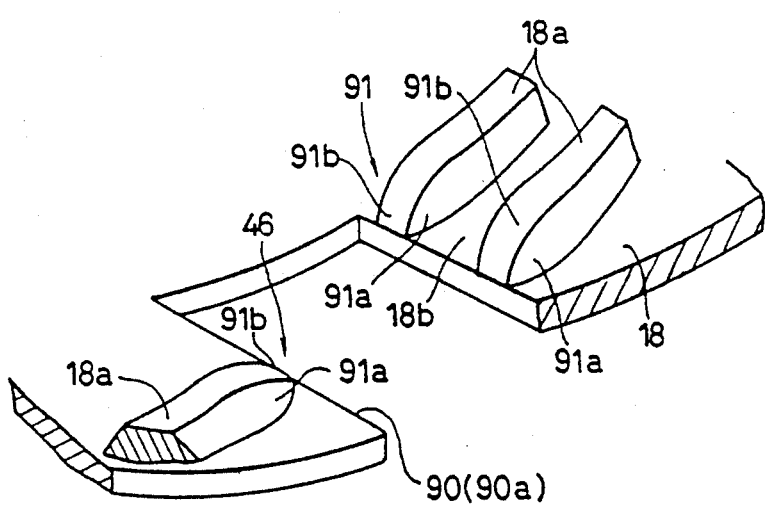
FIG. 24 is an enlarged perspective view of a main portion of the structure of FIG. 23.

One solution to this problem, which forms part of the present invention, is illustrated in FIGS. 23-25, in which the improvement is directed to the shape of the helicoid tooth surfaces.

End faces 91 of cutaway portion, 90 have inclined surfaces 91a, which serve to define helicoid groove 18b between adjacent helicoid teeth 18a. The groove has a width which gradually increases in a direction towards the cutaway portion or notch 90. Inclined surfaces 91a prevent possible collision of the end faces of the helicoids which might otherwise occur due to the presence of the clearance "c" which is provided between female helicoid ring 18 and male helicoid ring 20 whenever the end face of the male ring 20, which is disengaged from female helicoid ring 18 and cutaway portion 90, comes into engagement with female helicoid ring 18, such that the end face of helicoid teeth 20a of male helicoid ring 20 can be brought into engagement with helicoid groove 18b of the female helicoid ring 18. The end faces of helicoid teeth 18a have inclined surfaces 91b which are similar to the inclined surfaces 91a, and are provided to prevent the above-noted possible collisions between the radial end faces of the female helicoid ring 18 and male helicoid ring 20. Inclined surfaces 91b can be formed by gradually decreasing the height of helicoid teeth 20 towards cutaway portion 90. It is also possible to provide similar inclined surfaces 20c on the end faces of male helicoid ring 20. As a result of tapered surfaces 91a and 91b, the grooves 18b widen, and threads 18a narrow and shorten, in a direction towards the recess or notch 90.

With this arrangement, once the cam ring 22 comes to a specific rotational position in which the male helicoid ring 20 is disengaged from female helicoid ring 18 and cutaway portion 90, when the rotation of cam ring 22 has been reversed, the end face of the male helicoid ring 20 will face the end face 91 of the female ring 18 through the cutaway portion 90. At this time, the end faces of helicoid teeth 20a of the male helicoid ring 20 will be directed/conducted into the helicoid grooves 18b through inclined surfaces 91a. Accordingly, the male helicoid ring 20 will mesh with the female helicoid ring 18 in a normal fashion in order to smoothly move the cam ring 22 along the optical axis direction. As a result, there will be no failure of engagement due to the existence of the cut-away portion 90.

K. Flange Back Adjusting Mechanism

Flange back adjustment is effected by moving all of the lens groups so as to form a focused image on a film plane. Flange back adjustment is effected after zooming adjustment is completed (with no movement of focus being effected during zooming). In a conventional camera, flange back adjustment has been effected, e.g., by inserting a washer having an appropriate thickness between a member which supports the cam ring and the camera body. The present invention is designed to provide an easier flange back adjustment, as is illustrated in FIGS. 26-29.

In the illustrated embodiments, female helicoid ring 18A is rotatably adjustably supported by stationary barrel 12, so that rotation of the female helicoid ring 18A can change the relative angular position of the male helicoid ring 20 (and, accordingly, the cam ring 22), the rotation of which is restricted, and the female helicoid ring 18A, in order to move both lens group so as to effect flange back adjustment.

Stationary barrel 12 has, at its front end, a stationary flange 12a which lies in a plane perpendicular to the optical axis. Female helicoid ring 18A is provided along its outer periphery with a peripheral flange 18d which lies in a plane which is normal to the optical axis and which comes into contact with flange 12a of stationary barrel 12 in order to restrict the axial position of female helicoid ring 18A and to prevent the ring from becoming inclined with respect to the optical axis. A male helicoid ring 20 rotatably engages the inner helicoidal threads or teeth 18a of ring 18A, as in the above-noted and described embodiments.

Female helicoid ring 18A is immovably held by a C-shaped leaf spring 318 which is secured to stationary flange 12a by screws 317, in order to prevent it from moving in the optical axis direction. Leaf spring 318 has a plurality of elastically deformable tongues 318a which are elastically brought into contact with flange 18d. As a result, due to the friction which exists between flange 18d, flange 12a and leaf spring 318, rotation of female helicoid 18A is restricted. However, the female helicoid ring 18A can be rotated against the frictional force when an external force which overcomes the friction is applied thereto.

Flange 18d includes a partial sector gear 18e which is provided on the outer periphery of the flange.

Stationary flange 12a includes a shaft bearing hole 12g in which shaft 352 of a flange back adjusting jig (i.e. tool) 350 is inserted, in the vicinity of sector gear 18e. Flange back adjusting tool 350 has a pinion (i.e., an adjusting gear) 351 which is adapted to be engaged by sector gear 18e. Lock screw 319 is provided on stationary flange 12a in the area of shaft bearing hole 12g. Lock screw 319 includes a head surface 319a which is adapted to be brought into contact with flange 18d at the underside or surface of head 319a. In this fashion, whenever lock screw 319 is fastened, flange 18d can be firmly held between and by head 319a of lock screw 319, and stationary flange 12a, in order to prevent rotation of the female helicoid ring 18a. Further, when lock screw 319 is loosened, head 319a will become separated from flange 18d to permit the female helicoid ring 18a to rotate.

Decorative plate 411 of camera body 410 has an insertion hole 411a into which the flange back adjusting tool 350 can be inserted so that it will be positioned oppositely with respect to shaft bearing hole 12g of stationary flange 12a. Insertion hole 411a is covered by a removable cap 415, as shown in FIGS. 28 and 29.

The other construction of the embodiment illustrated in FIGS. 26-29 is essentially the same as that disclosed above with respect to the zoom lens barrel, i.e., wherein female helicoid ring 18A is connected to male helicoid ring (the inner ring) 20 to which cam ring 22 is secured.

After flange back adjustment by the flange back adjusting mechanism noted above, cam ring 22 is rotated into a photographing position in which a picture can be taken, such as the WIDE extremity position, so that the lock screw 319 can be loosened after cap 415 is removed. Thereafter, the flange back adjusting tool is inserted into the insertion hole 411a of decorative plate 411 in order to engage gear or pinion 351 of shaft 352 of tool 350 with sector gear 18e, as shown in FIG. 27. Thereafter, flange back adjusting tool 350 is rotated so that the actual focal point will approach the theoretical focal point on the film plane, while viewing the actual focal point at the WIDE extremity. As a result, since the male helicoid ring 20 is restricted or prevented from rotating by the pinion which is engaged by gear 20b and the motor, only the female helicoid ring 18A will rotate, with the result that relative rotation of the female helicoid ring 18A with respect to the male helicoid ring 20 will cause the male helicoid ring 20 to move in the optical axis direction, in accordance with the lead angle of the helicoid teeth 20a. Thus, both lens groups L1 and L2 move together along the optical axis direction without changing the distance between them in order to adjust the focal point, i.e., the flange back.

After flange back adjustment is completed, lock screw 319 is again fastened so as to lock female helicoid ring 18A. Thereafter, the flange back adjusting tool 350 is removed and insertion hole 411a is covered by cap 415.

As can be easily understood from the above, flange back adjustment can be easily effected even after the camera is assembled.

Figure 27A:
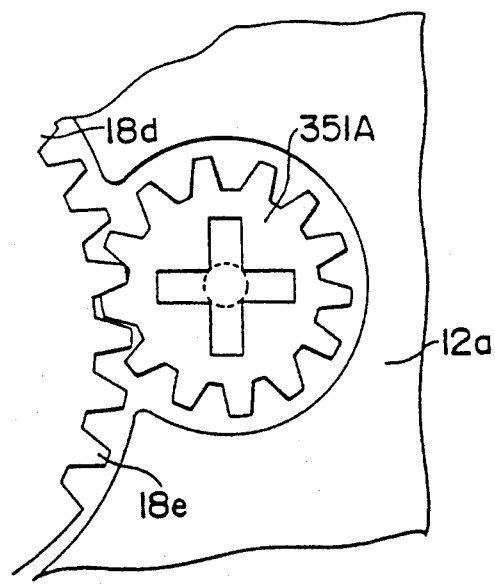
FIG. 27A is a front elevational view of an alternate embodiment of the mechanism illustrated in FIG. 27.

Although the flange back adjusting tool 350 has a pinion gear 351 as in the embodiment which is illustrated and referred to above, it is possible (as shown in FIG. 27A) to provide a gear 351A (instead of tool pinion 351) which can be engaged by sector gear 18e, on stationary flange 12a instead of on the tool 350. Gear 351A can be, e.g., frictionally fit on a shaft which is attached to the flange 12a. By providing a secure frictional fit, such that the gear 351A can only be rotated upon the application of a suitable force by a screwdriver, e.g., it should be noted that lock screw 319 can be eliminated. In such a case, the gear which is provided on stationary flange 12a would have, e.g., a cross-shaped groove or a (+) into which a screwdriver can be fitted. The screwdriver would then be used in lieu of the tool described above, e.g., and would be used to rotate gear 351A, and, therefore, sector gear 18e. This alternative construction essentially corresponds to an arrangement in which pinion 351 is rotatably supported within shaft bearing hole 12g of stationary flange 12a, and in which the shaft portion of pinion 351 would have an insertion hole for receiving the flange back adjusting tool as shown in FIG. 27.

Section gear 18e and shaft bearing hole 12g can be located at optional positions, e.g., on the left side portion or the lower side portion of camera body 410.

Although the present invention has been specifically described with respect to specific embodiments thereof, the embodiments are to be considered illustrative only and not restrictive, and various modifications and changes may be made without departing from the scope of the claims appended hereto.

What is claimed is:

1. A flexible printed circuit board adapted for use in a lens shutter type of zoom lens camera having an optical axis and a stationary barrel attached to a camera body, a rotatable cam ring which is adapted to be supported by said stationary barrel so as to move along the direction of the optical axis of said camera in accordance with rotation of said cam ring, a lens guide ring which is adapted to move together with said cam ring along the optical axis direction, wherein said cam ring is adapted to rotate relative to said lens guide ring in association with axial movement of said cam ring, at least tow movable front and rear lens groups which are adapted to be supported on said cam ring and on said lens guide ring so as to move along said optical axis direction along a predetermined track in associated with axial movement and relative rotation of said cam ring and said lens guide ring in order to change the focal length of said zoom lens, a shutter block adapted to move together with said movable lens groups along said optical axis direction, a control circuit associated with said camera body, said control circuit comprising means for driving and controlling said shutter block, said flexible printed circuit board comprising means for electrically connecting said shutter block and said control circuit, said flexible printed circuit board having a first portion extending rearwardly, within said barrel, from a location at which said first portion is attached to said control circuit to a rear end of said lens guide ring, said circuit board having a second portion extending forwardly from said first portion along an inner surface of said lens guide ring, said second portion being flexibly connected to said first portion, wherein a third portion of said flexible printed circuit board is attached to said second portion and extends rearwardly from said second portion, wherein said second and third circuit board portions are superimposed upon each other, and wherein a fourth portion of said flexible printed circuit board extends forwardly from said third portion to connect said circuit board to said shutter block, wherein said third and fourth flexible printed circuit board portions are flexibly connected to each other.

2. A flexible printed circuit board in accordance with claim 1, wherein at least one portion of said flexible printed circuit board is positioned within a flexible printed circuit board guide groove along said inner surface of said lens guide ring, said groove extending along said camera optical axis direction.

3. A flexible printed circuit board in accordance with claim 1, wherein at least one portion of said board is attached to an inner surface of said lens guide ring.

4. A flexible pointed circuit board in accordance with claim 2, wherein said flexible printed circuit board guide groove has a flat base surface.

5. A flexible pointed circuit board in accordance with claim 4, wherein said flexible printed circuit board is secured to said rear end of said lens guide ring.

6. A flexible printed circuit in accordance with claim 5, wherein said flexible printed circuit board is adhered to said flexible printed circuit board guide grooved at least along a portion of said flexible printed circuit board that extends forwardly from said lens guide ring.

7. A flexible printed circuit board assembly which is adapted for use in a camera having a zoom lens and an optical axis, said zoom lens including two lens groups, adapted to move along said axis, said camera including a stationary outer barrel and at least two concentric rings positioned within said barrel, and a shutter block which is adapted for movement with said lens groups along said optical axis, said flexible printed circuit board assembly comprising a flexible printed circuit board for electrically connecting said shutter block to a camera control circuit, said flexible printed circuit board having a first end adapted to be attached to said control circuit, a first portion adapted to extend rearwardly, from said first end which is attached to said control circuit, along the inner surface of said barrel, a second portion extending generally forwardly from said first portion along an inner surface of the inner one of said concentric rings, a third portion connected to, and extending rearwardly from, said second portion, wherein said third portion is partially superimposed upon said second portion, and a fourth portion which is connected to said third portion and which is flexibly connected to said shutter block.

8. An assembly in accordance with claim 7, wherein said fourth portion extends forwardly within said barrel and is partially superimposed upon said third flexible printed circuit board portion.

9. An assembly in accordance with claim 7, wherein said flexible printed circuit board is attached at least at one area to an inner one of said concentric rings.

10. An assembly in accordance with claim 9, said inner concentric ring having an elongated groove which is generally parallel to said optical axis, one of said at least one areas being located on said elongated groove.

11. An assembly in accordance with claim 9, wherein said inner concentric ring has a rear surface, one said at least one area being located on said rear ring surface.

12. An assembly in accordance with claim 9, wherein said inner concentric ring has a front end, one said at least one area being located on said front end.

13. An assembly in accordance with claim 7, wherein a linear movement guide plate is attached to a rear end of one of said concentric rings, and an additional portion of said flexible printed circuit board extends rearwardly of said guide plate, between said first and second portions.

* * * * *